US010686509B2

(12) United States Patent
Rahman et al.

(10) Patent No.: US 10,686,509 B2
(45) Date of Patent: Jun. 16, 2020

(54) METHOD AND APPARATUS FOR CODEBOOK SUBSET RESTRICTION FOR CSI REPORTING IN ADVANCED WIRELESS COMMUNICATION SYSTEMS

(71) Applicant: Samsung Electronics Co., Ltd., Suwon-si, Gyeonggi-do (KR)

(72) Inventors: Md. Saifur Rahman, Plano, TX (US); Eko Onggosanusi, Coppell, TX (US)

( * ) Notice: Subject to any disclaimer, the term of this patent is extended or adjusted under 35 U.S.C. 154(b) by 0 days.

(21) Appl. No.: 16/730,915

(22) Filed: Dec. 30, 2019

(65) Prior Publication Data

US 2020/0136702 A1 Apr. 30, 2020

Related U.S. Application Data

(63) Continuation of application No. 16/113,917, filed on Aug. 27, 2018, now Pat. No. 10,547,368.

(60) Provisional application No. 62/552,069, filed on Aug. 30, 2017, provisional application No. 62/554,125, filed on Sep. 5, 2017, provisional application No. 62/559,839, filed on Sep. 18, 2017, provisional application No. 62/561,322, filed on Sep. 21, 2017, provisional application No. 62/565,457, filed on Sep. 29, 2017.

(51) Int. Cl.

| | |
|---|---|
| ***H04B 7/06*** | (2006.01) |
| ***H04L 5/00*** | (2006.01) |
| ***H04B 7/0408*** | (2017.01) |
| ***H04B 7/0456*** | (2017.01) |
| *H04B 7/10* | (2017.01) |

(52) U.S. Cl.

CPC ......... *H04B 7/0626* (2013.01); *H04B 7/0408* (2013.01); *H04B 7/0473* (2013.01); *H04B 7/0478* (2013.01); *H04B 7/0482* (2013.01); *H04L 5/0057* (2013.01); *H04B 7/10* (2013.01)

(58) Field of Classification Search

CPC .. H04B 7/0626; H04B 7/0408; H04B 7/0473; H04B 7/0478; H04B 7/0482; H04L 5/0057

USPC .......................................................... 375/262

See application file for complete search history.

(56) References Cited

U.S. PATENT DOCUMENTS

2016/0142189 A1* 5/2016 Shin ..................... H04B 7/0626 370/329

2018/0254813 A1* 9/2018 Gao ..................... H04B 7/0456

(Continued)

*Primary Examiner* — Michael R Neff

(57) ABSTRACT

The method of UE for CSI reporting comprises receiving a higher layer signaling including CB SR information; determining a bitmap sequence B based on the CB SR information, wherein the bitmap sequence B includes a first bitmap sequence $B_1$ and a second bitmap sequence $B_2$; determining the first bitmap sequence $B_1$ and the second bitmap sequence $B_2$ based on the bitmap sequence B; identifying, based on the first bitmap sequence $B_1$ and the second bitmap sequence $B_2$, a restriction on P beam groups out of Q beam groups $G(r_1, r_2)$ for the CSI reporting; generating a CSI report based on the P beam groups with the identified restriction for the CSI reporting and remaining Q minus P beam groups without any restrictions for the CSI reporting; and transmitting the CSI report to the BS. The remaining beam groups are determined as the Q beam groups $G(r_1, r_2)$ minus the P beam groups.

24 Claims, 12 Drawing Sheets

(56) References Cited

U.S. PATENT DOCUMENTS

| | | | | |
|---|---|---|---|---|
| 2018/0343046 | A1* | 11/2018 | Park | H04B 7/0478 |
| 2019/0068256 | A1* | 2/2019 | Muruganathan | H04B 7/0626 |

* cited by examiner

METHOD AND APPARATUS FOR CODEBOOK SUBSET RESTRICTION FOR CSI REPORTING IN ADVANCED WIRELESS COMMUNICATION SYSTEMS

CROSS-REFERENCE TO RELATED APPLICATION(S) AND CLAIM OF PRIORITY

This application is a continuation of U.S. Non-Provisional patent application Ser. No. 16/113,917 filed Aug. 27, 2018, and claims priority to U.S. Provisional Patent Application Ser. No. 62/552,069 filed on Aug. 30, 2017; U.S. Provisional Patent Application Ser. No. 62/554,125, filed on Sep. 5, 2017; U.S. Provisional Patent Application Ser. No. 62/559,839, filed on Sep. 18, 2017; U.S. Provisional Patent Application Ser. No. 62/561,322, filed on Sep. 21, 2017; and U.S. Provisional Patent Application Ser. No. 62/565,457, filed on Sep. 29, 2017. The content of the above-identified patent documents is incorporated herein by reference.

TECHNICAL FIELD

The present disclosure relates generally to channel state information (CSI) acquisition at a base station, particularly, relates to codebook subset restriction for CSI reporting in advanced wireless communication systems.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE.

SUMMARY

Embodiments of the present disclosure provide methods and apparatuses for codebook subset restriction for CSI reporting in an advanced wireless communication system.

In one embodiment, a user equipment (UE) for channel state information (CSI) reporting in a wireless communication system is provided. The UE comprises a transceiver configured to receive, from a base station (BS), a higher layer signaling including codebook subset restriction (CBSR) information. The UE further comprises a processor operably connected to the transceiver, the processor configured to determine a bitmap sequence B based on the CBSR information. The bitmap sequence B includes a first bitmap sequence $B_1$ and a second bitmap sequence $B_2$. The processor is further configured to determine the first bitmap sequence $B_1$ and the second bitmap sequence $B_2$ based on the bitmap sequence B; identify, based on the first bitmap sequence $B_1$ and the second bitmap sequence $B_2$, a restriction on P beam groups out of Q beam groups $G(r_1, r_2)$ for the CSI reporting, wherein: P is a positive integer and is less than or equal to Q; Q is a total number of beam groups $G(r_1, r_2)$; and an index pair $(r_1, r_2)$ indicates a beam group of the Q beam groups $G(r_1, r_2)$. The processor is further configured to generate a CSI report based on the P beam groups with the identified restriction for the CSI reporting and remaining beam groups without any restrictions for the CSI reporting. The remaining beam groups are determined as the Q beam groups $G(r_1, r_2)$ minus the P beam groups. The transceiver is further configured to transmit the CSI report to the BS.

In another embodiment, a base station (BS) for channel state information (CSI) reporting in a wireless communication system is provided. The BS comprises a transceiver configured to transmit, to a user equipment (UE), a higher layer signaling including codebook subset restriction (CBSR) information; and receive, from the UE, a CSI report that is generated based on P beam groups with a restriction for the CSI reporting and remaining beam groups without any restrictions for the CSI reporting. The remaining beam groups are determined as the Q beam groups $G(r_1, r_2)$ minus the P beam groups. The CBSR information includes a bitmap sequence B that further includes a first bitmap sequence $B_1$ and a second bitmap sequence $B_2$. The first bitmap sequence $B_1$ and the second bitmap sequence $B_2$ indicate the restriction on P beam groups out of Q beam groups $G(r_1, r_2)$ for the CSI reporting. P is a positive integer and is less than or equal to Q; Q is a total number of beam groups $G(r_1, r_2)$; and an index pair $(r_1, r_2)$ indicates a beam group of the Q beam groups $G(r_1, r_2)$.

In yet another embodiment, a method of user equipment (UE) for channel state information (CSI) reporting in a wireless communication system is provided. The method comprises receiving, from a base station (BS), a higher layer signaling including codebook subset restriction (CBSR) information; determining a bitmap sequence B based on the CBSR information, wherein the bitmap sequence B includes a first bitmap sequence $B_1$ and a second bitmap sequence $B_2$; determining the first bitmap sequence $B_1$ and the second bitmap sequence $B_2$ based on the bitmap sequence B; identifying, based on the first bitmap sequence $B_1$ and the second bitmap sequence $B_2$, a restriction on P beam groups out of Q beam groups $G(r_1, r_2)$ for the CSI reporting, wherein: P is a positive integer and is less than or equal to Q; Q is a total number of beam groups $G(r_1, r_2)$; and an index pair $(r_1, r_2)$ indicates a beam group of the Q beam groups $G(r_1, r_2)$. The method of UE further comprises generating a CSI report based on the P beam groups with the identified restriction for the CSI reporting and remaining beam groups without any restrictions for the CSI reporting; and transmitting the CSI report to the BS. The remaining beam groups are determined as the Q beam groups $G(r_1, r_2)$ minus the P beam groups.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term “couple” and its derivatives refer to any direct or indirect communication between two or more elements, whether or not those elements are in physical contact with one another. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
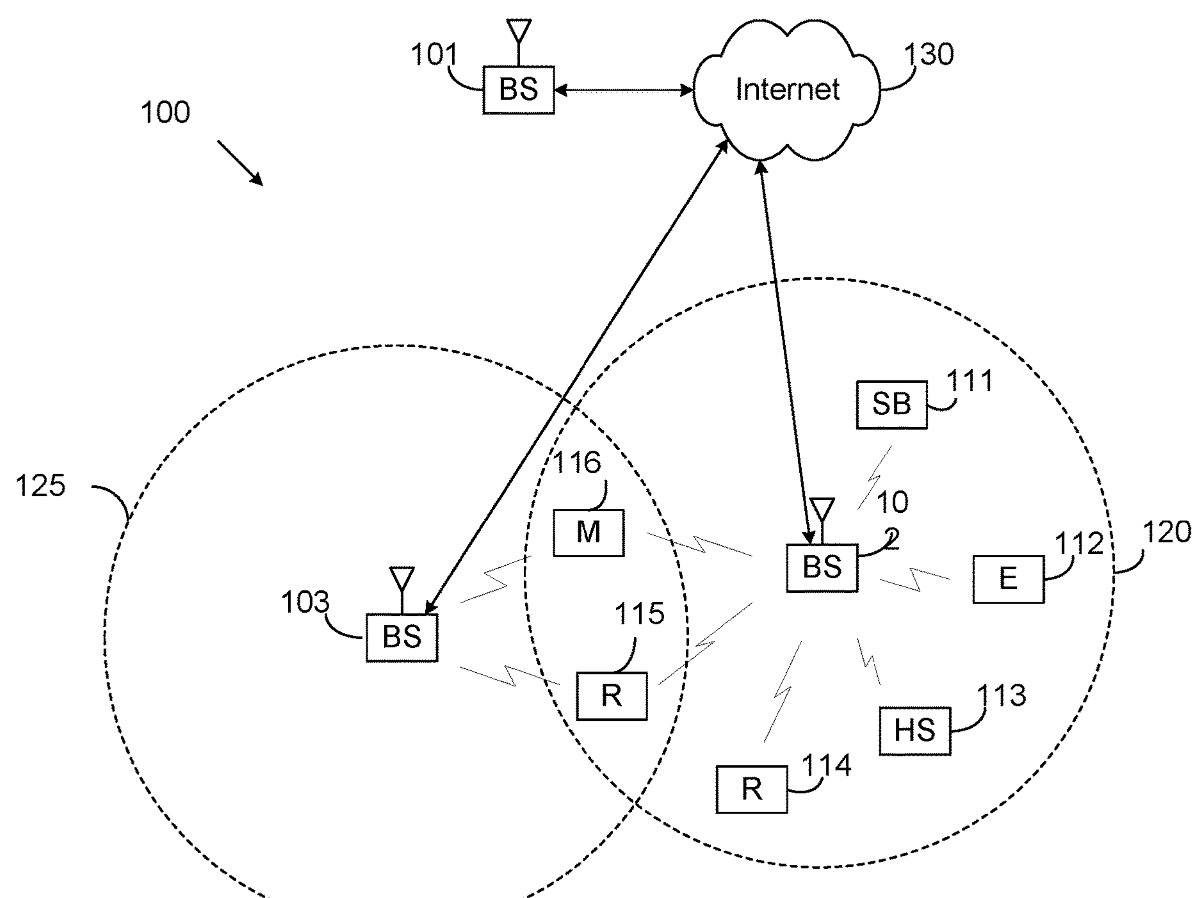
FIG. 1 illustrates an example wireless network according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.3.0, "E-UTRA, Physical channels and modulation;" 3GPP TS 36.212 v14.3.0, "E-UTRA, Multiplexing and Channel coding;" 3GPP TS 36.213 v14.3.0, "E-UTRA, Physical Layer Procedures;" 3GPP TS 36.321 v14.3.0, "E-UTRA, Medium Access Control (MAC) protocol specification;" 3GPP TS 36.331 v14.3.0, "E-UTRA, Radio Resource Control (RRC) protocol specification;" 3GPP TR 22.891 v1.2.0; and 3GPP TS 38.214 v15.1.0, "NR, Physical Layer Procedures for Data."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
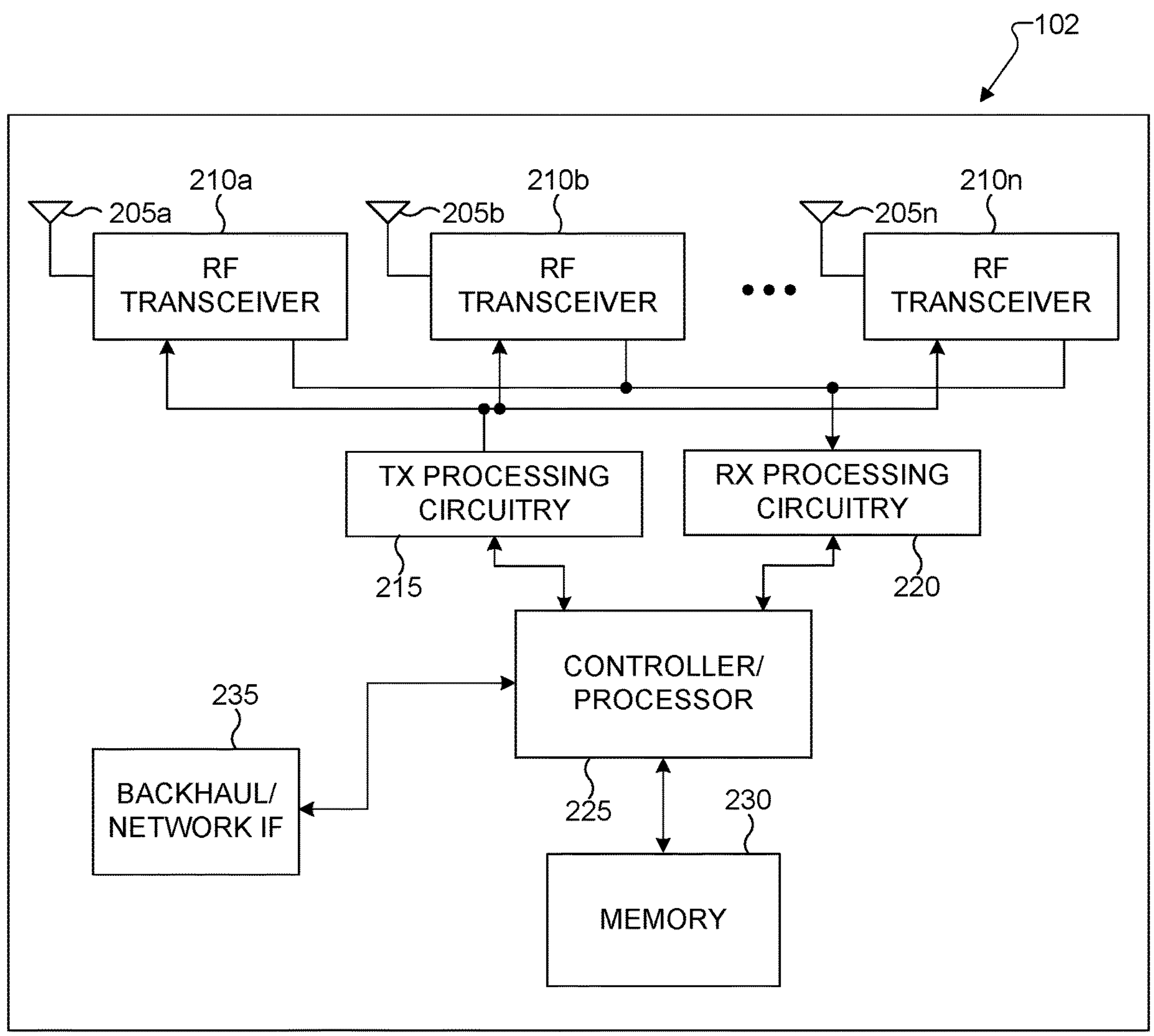
FIG. 2 illustrates an example eNB according to embodiments of the present disclosure.
Figure 3:
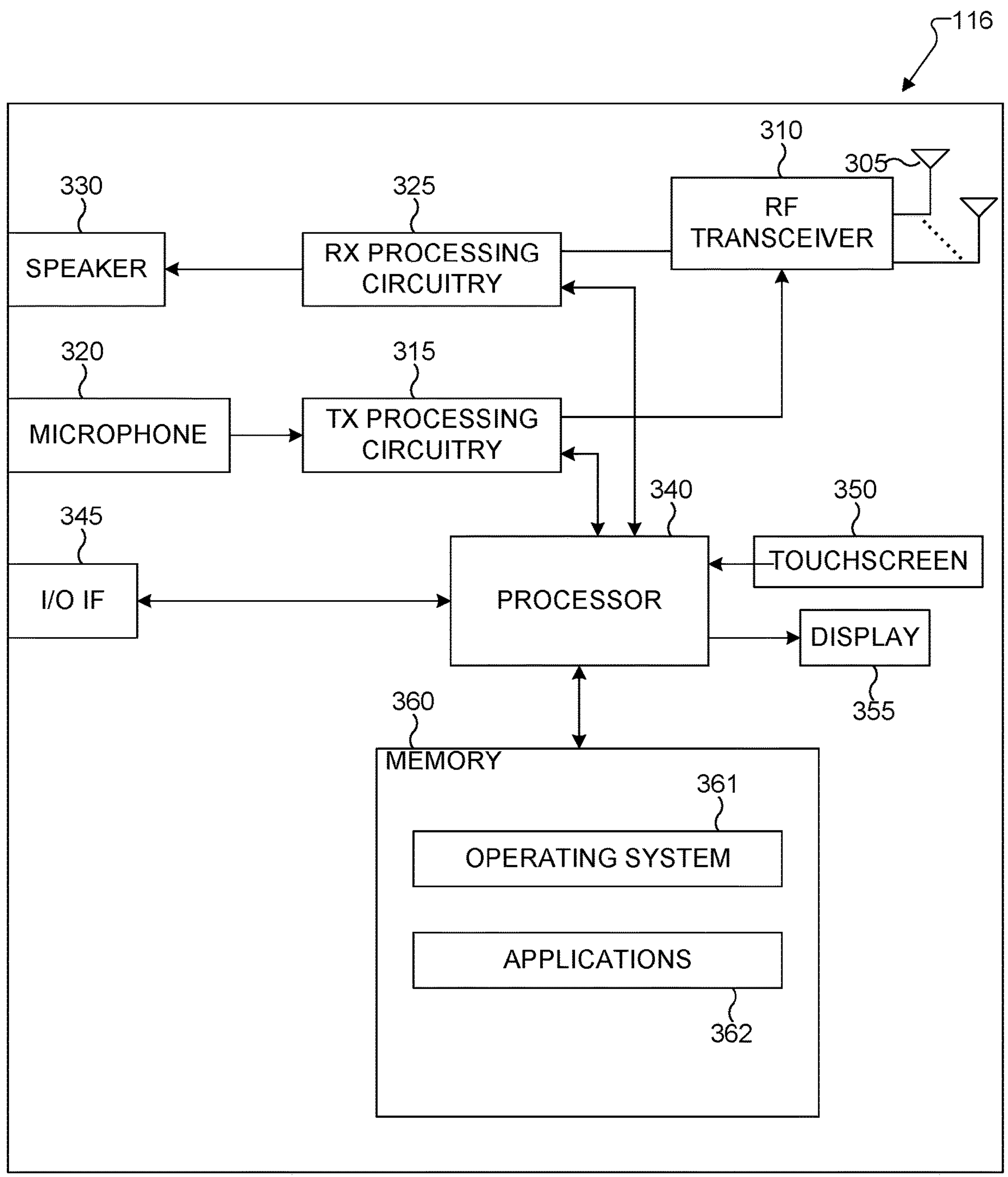
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient codebook subset restriction in an advanced wireless communication system. In certain embodiments, and one or more of the eNBs 101-103 includes circuitry, programming, or a combination thereof, for codebook subset restriction for CSI reporting in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205*a*-205*n*, multiple RF transceivers 210*a*-210*n*, transmit (TX) processing circuitry 215, and receive (RX) processing circuitry 220. The eNB 102 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the eNB 102. For example, the controller/processor 225 could control the reception of forward channel signals and the transmission of reverse channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205*a*-205*n* are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
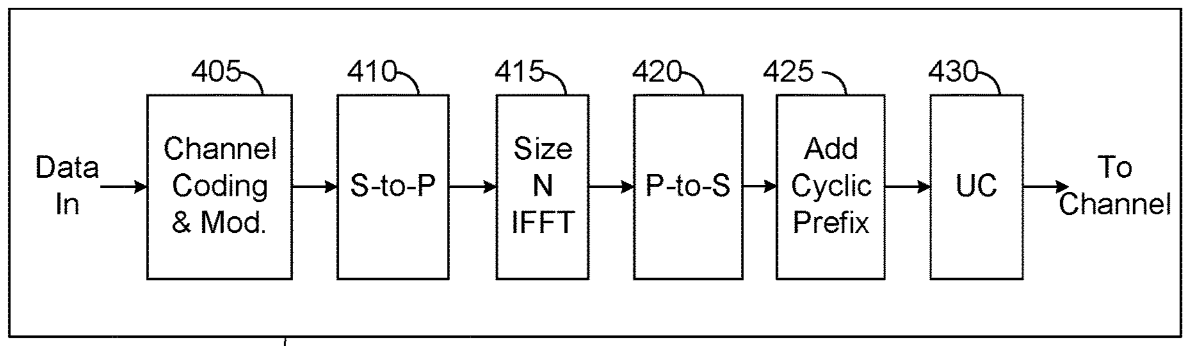
FIG. 4A illustrates a high-level diagram of an orthogonal frequency division multiple access transmit path according to embodiments of the present disclosure.
Figure 4B:
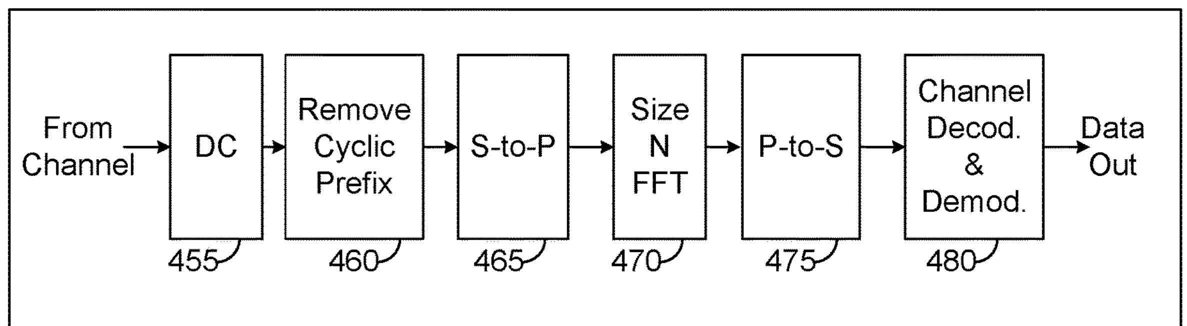
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $MP_{sc}^{PDSCH}=M_{PDSCH}\cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB}\cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 5:
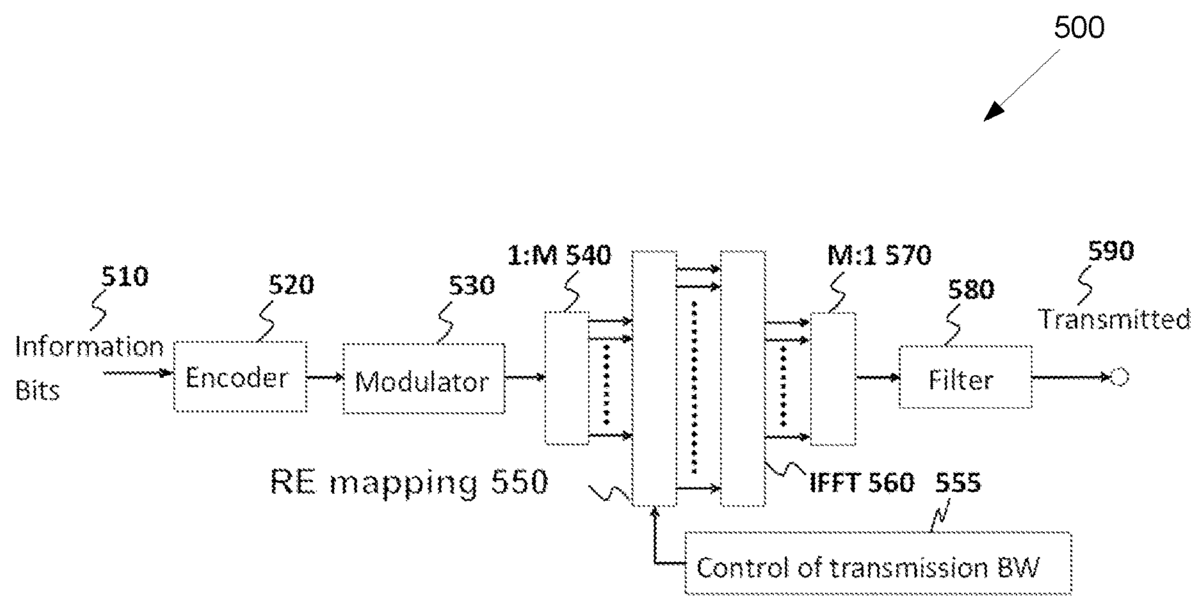
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
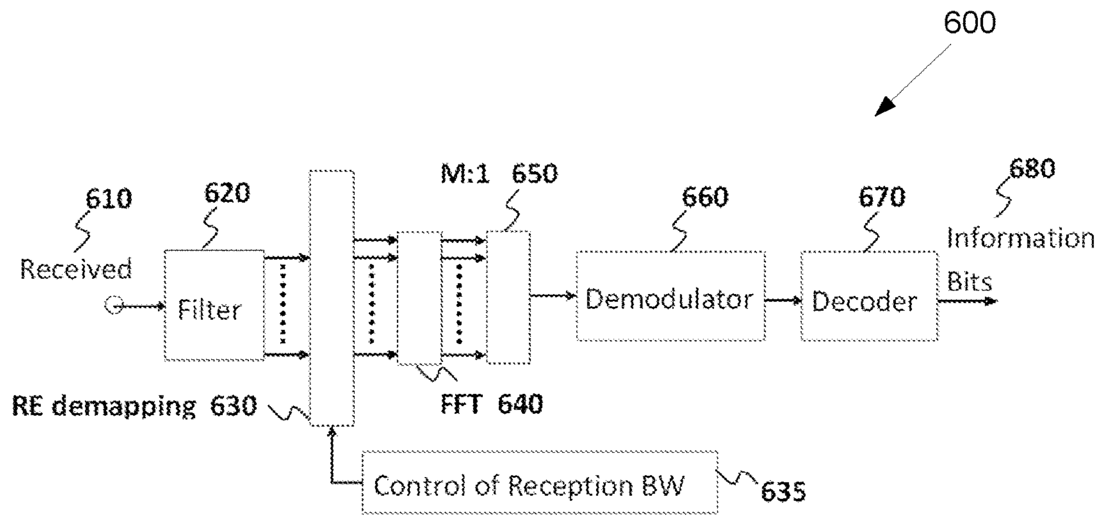
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
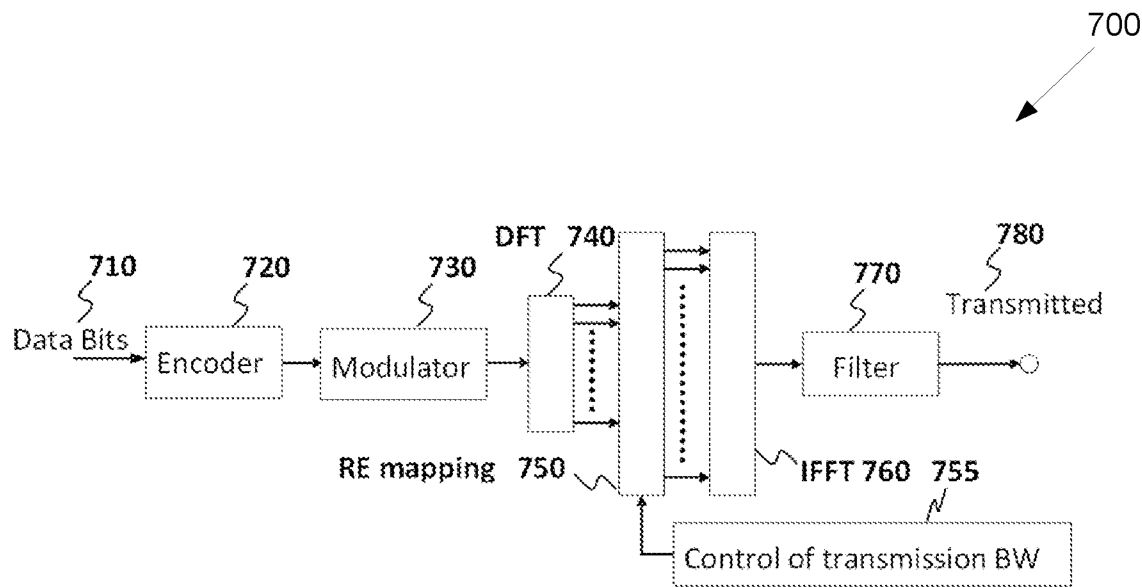
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
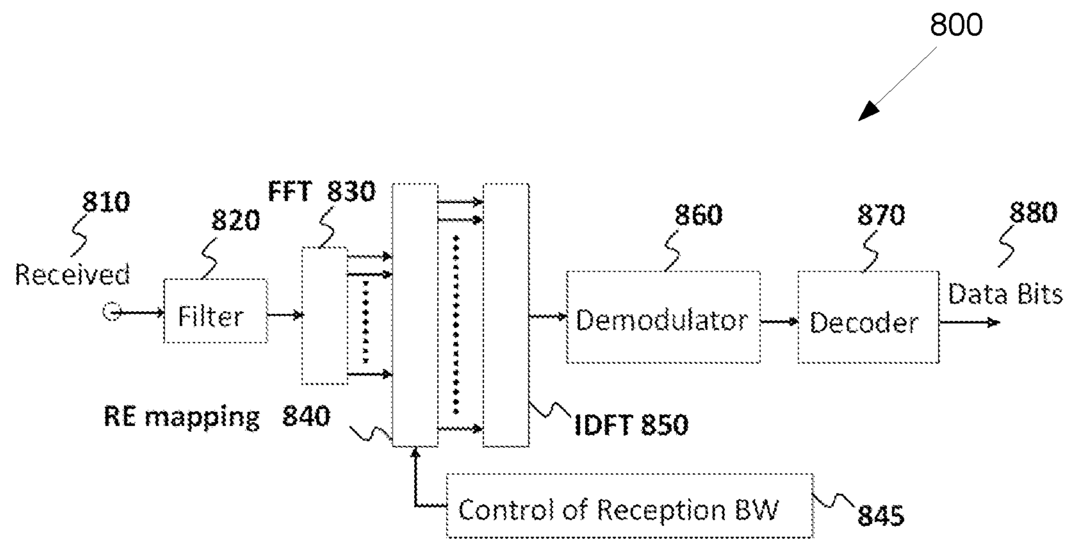
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
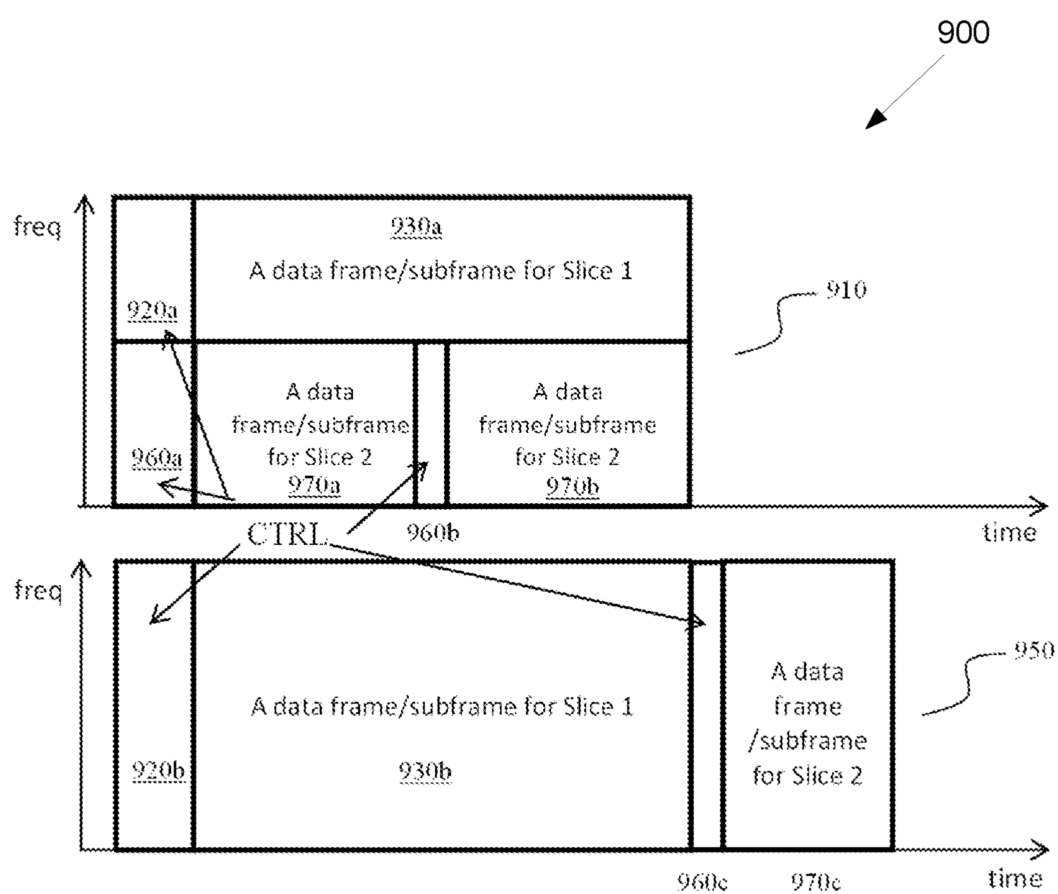
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
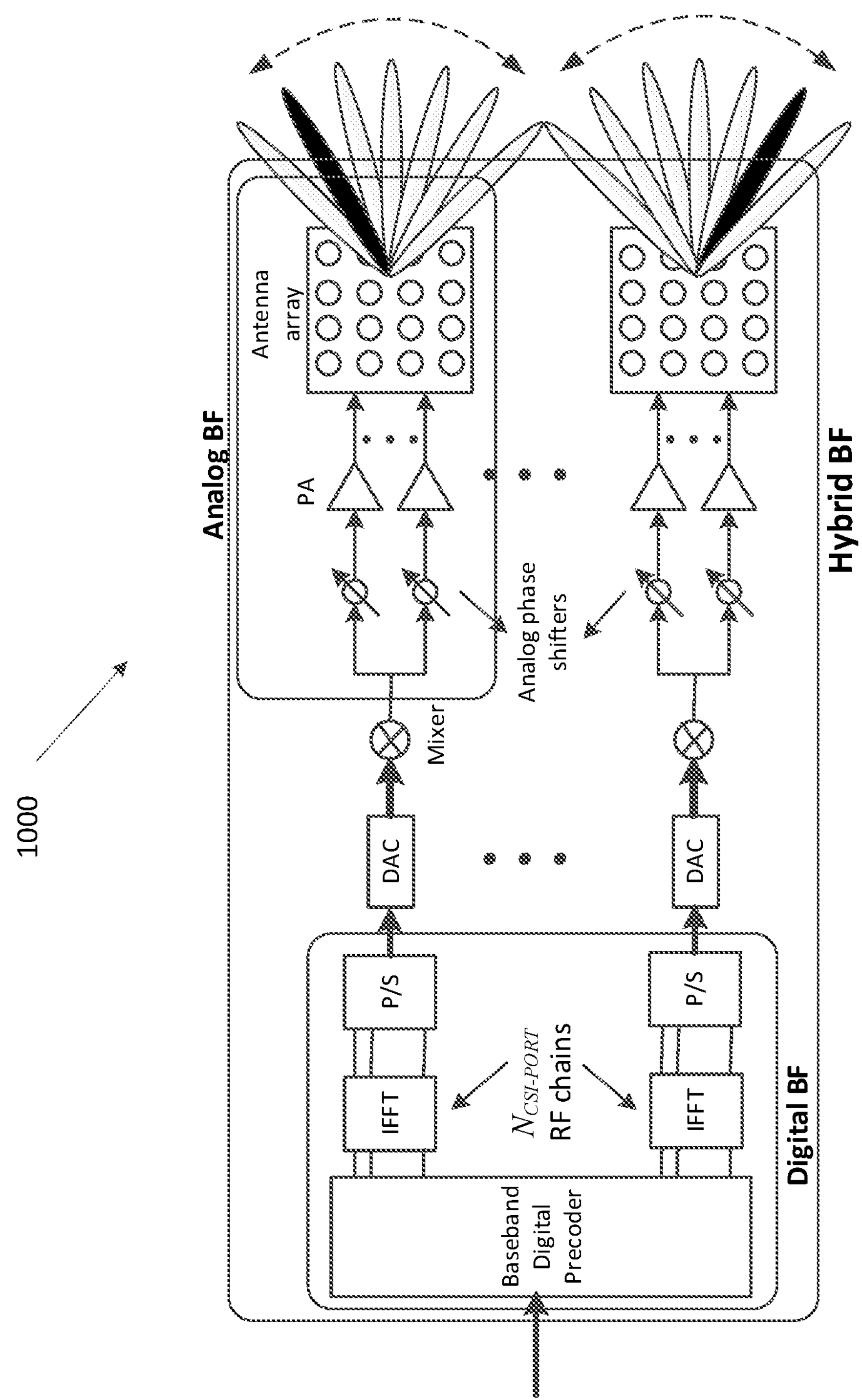
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI\text{-}PORT}$. A digital beamforming unit performs a linear combination across $N_{CSI\text{-}PORT}$ analog beams to further increase precoding gain. While analog beams are wideband (hence not frequency-selective), digital precoding can be varied across frequency sub-bands or resource blocks.

Figure 11:
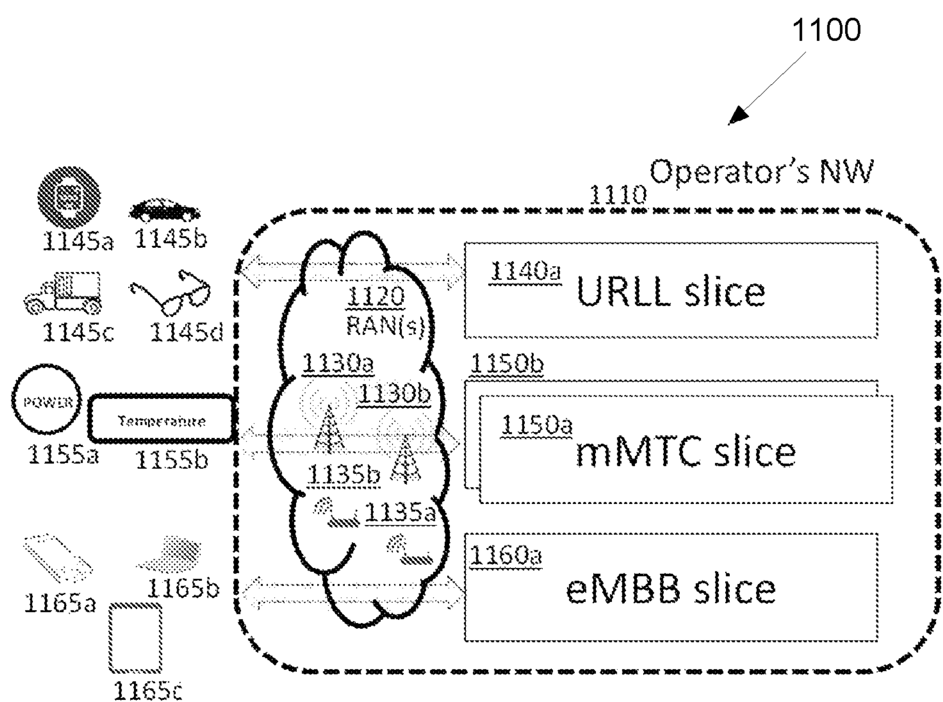
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the configuration 1100.

In order for the 5G network to support such diverse services with different quality of services (QoS), one scheme has been identified in LTE specification, called network slicing.

As shown in FIG. 11, An operator's network 1110 includes a number of radio access network(s) 1120 (RAN(s)) that are associated with network devices such as eNBs 1130*a* and 1130*b*, small cell base stations (femto/pico eNBs or Wi-Fi access points) 1135*a* and 1135*b*. The network 1110 can support various services, each represented as a slice.

In the example, an URLL slice 1140*a* serves UEs requiring URLL services such as cars 1145*b*, trucks 1145*c*, smart watches 1145*a*, and smart glasses 1145*d*. Two mMTC slices 1150*a* and 550*b* serve UEs requiring mMTC services such as power meters 555*b*, and temperature control box 1155*b*. One eMBB slice 1160*a* serves UEs requiring eMBB services such as cells phones 1165*a*, laptops 1165*b*, and tablets 1165*c*. A device configured with two slices can also be envisioned.

From LTE specification, MIMO has been identified as an essential feature in order to achieve high system throughput requirements and MIMO may continue to be the same in NR. One of the key components of a MIMO transmission scheme is the accurate CSI acquisition at the eNB (or TRP).

For MU-MIMO, in particular, the availability of accurate CSI is necessary in order to guarantee high MU performance. For TDD systems, the CSI can be acquired using the SRS transmission relying on the channel reciprocity.

For FDD systems, on the other hand, it can be acquired using the CSI-RS transmission from eNB, and CSI acquisition and feedback from UE. In FDD systems, the CSI feedback framework is "implicit" in the form of CQI/PMI/RI derived from a codebook assuming SU transmission from eNB. Because of the inherent SU assumption while deriving CSI, this implicit CSI feedback is inadequate for MU transmission. Since future (e.g. NR) systems are likely to be more MU-centric, this SU-MU CSI mismatch may be a bottleneck in achieving high MU performance gains. Another issue with implicit feedback is the scalability with larger number of antenna ports at eNB.

For large number of antenna ports, the codebook design for implicit feedback is quite complicated (for example, in LTE specification, the total number of Class A codebooks=44), and the designed codebook is not guaranteed to bring justifiable performance benefits in practical deployment scenarios (for example, only a small percentage gain can be shown at the most). Realizing aforementioned issues, it has agreed to provide specification support to advanced CSI reporting in LTE specification, which, at the very least, can serve as a good starting point to design advanced CSI scheme in NR MIMO. Compared to LTE specification, the CSI acquisition for NR MIMO may consider the following additional differentiating factors.

In one example of flexibility CSI reporting framework, CSI reporting in NR may be flexible to support users with different CSI reporting capabilities. For example, some users may only be capable of reporting implicit CSI in the form of PMI/CQI/RI as in LTE and some other users may be capable of reporting both implicit as well as explicit channel reporting. In addition, UE motilities in NR can range from 0 kmph to 500 kmph. So, CSI reporting framework may be able to support such diverse use cases and UE capabilities.

In one example of increased number of antenna ports, in NR MIMO, the number of antenna elements at the eNB can be up to 256, which means that the total number of antenna ports can be more than 32, which is the maximum number of antenna ports supported in LTE eFD-MIMO. Although this can be accommodated with partial-port CSI-RS mapping where each subset consists of at most 32 ports, the total number of ports across time can be extended to a much larger number. As the number of ports increases, meaningful system gain can only be obtained in a MU-centric system.

In one example of increased throughput requirement, the system throughput requirements (e.g. for eMBB in NR) is several times more than that for LTE eFD-MIMO. Such high throughput requirements can only be met with a mechanism to provide very accurate CSI to the eNB.

In one example of beamforming, following the trend established in FD-MIMO, NR MIMO system may be beamformed either cell-specifically or UE-specifically, where the beams can either be of analog (RF) or digital or hybrid type. For such a beam-formed system, a mechanism is needed to obtain accurate beam-forming information at the eNB.

In one example of unified design, since NR includes both above and below 6 GHz frequency bands, a unified MIMO framework working for both frequency regimes may be preferable.

This disclosure of invention covers several components which can be used in conjunction or in combination with one another, or can operate as standalone schemes.

Figure 12:
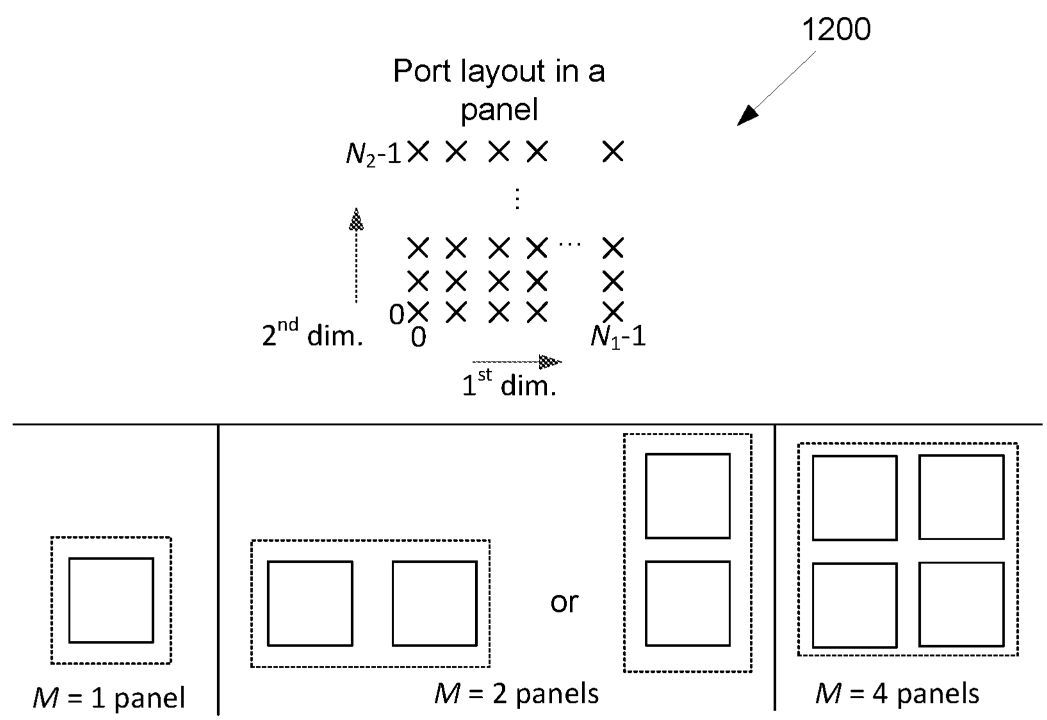
FIG. 12 illustrates an example multiple antenna panels according to embodiments of the present disclosure.

FIG. 12 illustrates an example multiple antenna panels 1200 according to embodiments of the present disclosure. The embodiment of the multiple antenna panels 1200 illustrated in FIG. 12 is for illustration only. FIG. 12 does not limit the scope of this disclosure to any particular implementation.

In the following, it is assumed that $N_1$ and $N_2$ are the number of antenna ports with the same polarization in the first and second dimensions, respectively. For 2D antenna port layouts, $N_1>1$, $N_2>1$, and for 1D antenna port layouts, $N_1>1$ and $N_2=1$ or $N_2>1$ and $N_1=1$. In the rest of the present disclosure, 1D antenna port layouts with $N_1>1$ and $N_2=1$ is considered. The present disclosure, however, is applicable to the other 1D port layouts with $N_2>1$ and $N_1=1$. An illustration of 2D antenna port layout is shown in FIG. 12 for M=1, 2, and 4 antenna panels. For a dual-polarized antenna port layout, the total number of antenna ports is $2MN_1N_2$.

A PMI codebook based on dual-stage pre-coder structure $W=W_1W_2$ and weighted linear combination of L beams is considered for high-resolution (Type II) CSI reporting assuming a single antenna panel (M=1). In one example, $W_1$ component of the pre-coder is used to select: an orthogonal basis set comprising of uniformly spaced $(N_1,N_2)$ DFT beams; $L\in\{2,3,4\}$ beams freely out of the $L_1L_2$ DFT beams in a basis set; per layer strongest coefficient (out of L beams and two polarizations); and per layer WB amplitude values for the remaining 2L−1 coefficients.

In such example, L is RRC configurable. This selection is WB or partial band (e.g. a set of SBs). For layer l, the basis comprising of L $W_1$ beams is given by $B_l=[b_{k_{1,l}^{(o)},k_{2,l}^{(o)}}, \ldots, b_{k_{1,l}^{(L-1)},k_{2,l}^{(L-1)}}]$, where $b_{k_1,k_2}$ is a 2D DFT beam, $B_l^H B=I$ and $\{(k_{1,l}^{(i)}, k_{2,l}^{(i)}:i, 0, 1, \ldots, L-1\}$ are indices of L beams for layer l. The WB amplitude matrix $P_{r,l}^{(WB)}$ is a L×L diagonal matrix with diagonal elements in [0, 1] which correspond to amplitudes of L coefficients for polarization r and layer l.

In another example, $W_2$ component is used to combine L beams for each SB. The SB amplitude and phase of the combining coefficients are reported separately. The SB amplitude matrix $P_{r,l}^{(SB)}$ is a Lx L diagonal matrix with diagonal elements in [0, 1] which correspond to amplitudes of L coefficients for polarization r and layer l. The phase of coefficients for polarization r and layer l is given by $c_{r,l}=[c_{r,l,0}, \ldots, c_{r,l,L-1}]^T$, where $$c_{r,l,i} = \exp\left(\frac{j2\pi n}{2^N}\right) \forall\, r,\, l,\, i;\, N \in \{2, 3\}.$$

For rank 1 and rank 2, the precoders are given by $$W = \begin{bmatrix} \tilde{w}_{0,0} \\ \tilde{w}_{1,1} \end{bmatrix} \text{ and } W = \begin{bmatrix} \tilde{w}_{0,0} & \tilde{w}_{0,1} \\ \tilde{w}_{1,0} & \tilde{w}_{1,1} \end{bmatrix},$$

where $$\tilde{w}_{r,l} = B_l P_{r,l}^{(WB)} P_{r,l}^{(SB)} c_{r,l} = \sum_{i=0}^{L-1} b_{k_{1,l}^{(i)} k_{2,l}^{(i)}} \cdot p_{r,l,i}^{(WB)} \cdot p_{r,l,i}^{(SB)} \cdot c_{r,l,i};\ = 0,\ 1,$$

$$l = 0,\ 1,$$

where $k_1=O_1n_1+q_1$, $n_1=0, 1, \ldots N_1-1$, $q_1=0, 1, \ldots, O_1-1$ and $k_2=O_2n_2+q_2$, $n_2=0, 1, \ldots N_2-1$, $q_2=0, 1, \ldots, O_2-1$, where $O_1$ and $O_2$ are oversampling factors in the first and the second dimensions, respectively. The WB amplitude $p_{r,l,i}^{(WB)}$ is reported using a 3-bit WB amplitude codebook and the SB amplitude $p_{r,l,i}^{(SB)}$ is reported using a 1-bit SB amplitude codebook. The SB amplitude can be turned ON or OFF via higher layer signaling of parameter SubbandAmplitude.

When $\upsilon \le 2$, where $\upsilon$ is the associated RI value, each PMI value corresponds to the codebook indices $i_1$ and $i_2$ where $$i_1 = \begin{cases} [\, i_{1,1} \;\; i_{1,2} \;\; i_{1,3,1} \;\; i_{1,4,1} \,] & \upsilon = 1 \\ [\, i_{1,1} \;\; i_{1,2} \;\; i_{1,3,1} \;\; i_{1,4,1} \;\; i_{1,3,2} \;\; i_{1,4,2} \,] & \upsilon = 2 \end{cases}$$

$$i_2 = \begin{cases} [i_{2,1,1}] & SubbandAmplitude = \text{OFF}, \upsilon = 1 \\ [\, i_{2,1,1} \;\; i_{2,1,2} \,] & SubbandAmplitude = \text{OFF}, \upsilon = 2 \\ [\, i_{2,1,1} \;\; i_{2,2,1} \,] & SubbandAmplitude = \text{ON}, \upsilon = 1 \\ [\, i_{2,1,1} \;\; i_{2,2,1} \;\; i_{2,1,2} \;\; i_{2,2,2} \,] & SubbandAmplitude = \text{ON}, \upsilon = 2 \end{cases}.$$

The L DFT beams or DFT vectors for combination are identified by the two components $i_{1,1}$ and $i_{1,2}$ of the codebook index $i_1$, where $$i_{1,1} = [\, q_1 \;\; q_2 \,]$$
$$q_1 \in \{0, 1, \ldots, O_1 - 1\}$$
$$q_2 \in \{0, 1, \ldots, O_2 - 1\}$$

indicates the orthogonal basis set comprising of $N_1N_2$ DFT beams, and $$i_{1,2} = [\, n_1 \;\; n_2 \,]$$
$$n_1 = [n_1^{(0)}, \ldots, n_1^{(L-1)}]$$
$$n_2 = [n_2^{(0)}, \ldots, n_2^{(L-1)}]$$
$$n_1^{(i)} \in \{0, 1, \ldots, N_1 - 1\}$$
$$n_2^{(i)} \in \{0, 1, \ldots, N_2 - 1\}$$

where the quantities $n_1^{(i)}$ and $n_2^{(i)}$ indicate the indices of the i-th beam in the first and the second dimensions, respectively. The beam indices $(n_1^{(i)}, n_2^{(i)})$ for i=0, 1 . . . , L−1 are reported either independently or jointly using $i_{1,2}$.

For i=0, 1, . . . , L−1, the L DFT vectors for linear combination are the given by $v_{m_1^{(i)}, m_2^{(i)}}$, $$v_{l,m} = \left[ u_m \;\; e^{j\frac{2\pi l}{O_1 N_1}} u_m \;\; \ldots \;\; e^{j\frac{2\pi l(N_1-1)}{O_1 N_1}} u_m \right]^T$$

where $$u_m = \begin{cases} \left[ 1 \;\; e^{j\frac{2\pi m}{O_2 N_2}} \;\; \ldots \;\; e^{j\frac{2\pi m(N_2-1)}{O_2 N_2}} \right] & N_2 > 1 \\ 1 & N_2 = 1 \end{cases}$$

the quantities $m_1^{(i)}$ and $m_2^{(i)}$ are given by $$m_1^{(i)} = O_1 n_1^{(i)} + q_1$$
$$m_2^{(i)} = O_2 n_2^{(i)} + q_2$$

and correspond to the DFT beam indices in the oversampled DFT codebook.

The strongest coefficient on layer l, l=1, . . . , $\upsilon$ is identified by $i_{1,3,l} \in \{0, 1, \ldots, 2L-1\}$. The WB and SB amplitude coefficient indicators, $i_{1,4,l}$ and $i_{2,2,l}$, indicate the amplitude coefficients $P_{r,l}^{(WB)}$ and $P_{r,l}^{(SB)}$, respectively. The SB phase indicator $i_{2,1,l}$ indicates the phase coefficient $c_{r,l}$.

Component 1—codebook subset restriction for high-resolution (type II) CSI codebook Several embodiments are provided next for the codebook subset restriction (CBSR) of the high-resolution (Type II) codebook. In the present disclosure, a bitmap $B = b_0 b_1 b_2 \ldots b_{K-1}$ of length K corresponds to a sequence of bits where bit $b_i \in \{0,1\}$ for all i=0, 1, . . . , K−1. If a bit $b_i$ is set to 0, then the CSI parameter that the CSI parameter represents is restricted (and hence not used) for CSI reporting.

In one embodiment 1, a UE is configured with beam-level CBSR via higher layer (e.g. RRC) signaling of a bitmap, $B = b_0 b_1 b_2 \ldots b_{K-1}$, of length K to restrict the values of the first PMI component $i_{1,1}$ (indicating $q_1$ and $q_2$). If a bit $b_i$ in the bitmap B is set to zero, then the corresponding value for $i_{1,1}$ is restricted (or not used) for PMI ($i_1$ and $i_2$) reporting.

For 1D port layouts ($N_2=1$), the bitmap B restricts the values for $q_1$ (since $q_2=0$) and $K=O_1$.

For 2D port layouts ($N_2>1$), at least one of the following alternatives is used to restrict the values for $q_1$ and $q_2$.

In one alternative (Alt) 1A, independent restriction according to at least one of the following alternatives. In one example of Alt 1A-0, the bitmap $B=B_1B_2$ comprises two separate bitmaps $B_1$ and $B_2$ to restrict the values for $q_1$ and $q_2$, respectively, where the bitmap $B_1$ is of length $O_1$ and the bitmap $B_2$ is of length $O_2$. So, $K=O_1+O_2$. In another example of Alt 1A-1, the bitmap $B=B_2B_1$ comprises two separate bitmaps $B_1$ and $B_2$ to restrict the values for $q_1$ and $q_2$, respectively, where the bitmap $B_1$ is of length $O_1$ and the bitmap $B_2$ is of length $O_2$. So, $K=O_1+O_2$.

In one alternative Alt 1B,joint restriction in which the bitmap B restricts the values for the pair ($q_1$, $q_2$) jointly, and hence $K=O_1O_2$. One of Alt 1A-0, Alt 1A-1, and Alt 1B is either fixed in the specification or configured via higher layer RRC or more dynamic MAC CE based or (UL-related or DL-related) DCI signaling.

In one embodiment 2, a UE is configured with beam-level CBSR via higher layer (e.g. RRC) signaling of a bitmap, $B = b_0 b_1 b_2 \ldots b_{K-1}$, of length K to restrict the values of the first PMI component $i_{1,2}$ (indicating L beam selection). If a bit $b_1$ in the bitmap B is set to zero, then the corresponding value for $i_{1,2}$ is restricted (or not used) for PMI ($i_1$ and $i_2$) reporting.

For 1D port layouts ($N_2=1$), at least one of the following alternatives is used. In one example of Alt 2A, the bitmap B restricts the values for $n_1^{(i)}$ for all i=0, 1, . . . , L−1 (since $n_2^{(i)}=0$) and $K=N_1$. In one example of Alt 2B, the bitmap B restricts the values for $i_{1,2}$ directly. If $i_{1,2}$ indicates L beams jointly, then the number of L beam combinations out of $N_1$ beams is $$\binom{N_1}{L},$$

and hence $$K = \binom{N_1}{L}.$$

One of Alt 2A and Alt 2B is either fixed in the specification or configured via higher layer RRC or more dynamic MAC CE based or (UL-related or DL-related) DCI signaling.

For 2D port layouts ($N_2>1$), at least one of the following alternatives is used to restrict the values for $n_1^{(i)}$ and $n_2^{(i)}$. In one example of Alt 2C, independent restriction according to at least one of the following alternatives is achieved. In one instance of Alt 2C-0, the bitmap $B=B_1B_2$ comprises two separate bitmaps $B_1$ and $B_2$ to restrict the values for $n_1^{(i)}$ and $n_2^{(i)}$, respectively, for all i=0, 1, . . . , L−1, where the bitmap $B_1$ is of length $N_1$ and the bitmap $B_2$ is of length $N_2$. So, $K=N_1+N_2$. In another instance of Alt 2C-1, the bitmap $B=B_2B_1$ comprises two separate bitmaps $B_1$ and $B_2$ to restrict the values for $n_1^{(i)}$ and $n_2^{(i)}$, respectively, for all i=0, 1, . . . , L−1, where the bitmap $B_1$ is of length $N_1$ and the bitmap $B_2$ is of length $N_2$. So, $K=N_1+N_2$.

In another example of Alt 2D, joint restriction according to at least one of the following alternatives is achieved. In one instance of Alt 2D-0, the bitmap B is a joint bitmap to restrict the values for the pair $(n_1^{(i)}, n_1^{(i)})$ for all i=0, 1, . . . , L−1, and hence $K=N_1N_2$. In one instance of Alt 2D-1, the bitmap B is a joint bitmap to restrict the values for $i_{1,2}$ directly. If $i_{1,2}$ indicates L beams jointly, then the number of L beam combinations out of $N_1N_2$ beams is $$\binom{N_1N_2}{L},$$

and hence $$K = \binom{N_1N_2}{L}.$$

One of Alt 2C-0, Alt 2C-1, Alt 2D-0, and Alt 2D-1 is either fixed in the specification or configured via higher layer RRC or more dynamic MAC CE based or (UL-related or DL-related) DCI signaling.

In one embodiment 3, a UE is configured with beam-level CBSR via higher layer (e.g. RRC) signaling of a bitmap, $B=B^{(1)}B^{(2)}$ or $B=B^{(2)}B^{(1)}$, comprising two separate bitmaps $B^{(1)}=b_0^{(1)}b_1^{(1)} \ldots b_{K_1-1}^{(1)}$ and $B^{(2)}=b_0^{(2)}b_1^{(2)} \ldots b_{K_2-1}^{(2)}$ of lengths $K_1$ and $K_2$, respectively to separately restrict the values of the first PMI components $i_{1,1}$ (indicating $q_1$ and $q_2$) and $i_{1,2}$ (indicating L beam selection), respectively. If a bit $b_i^{(1)}$ in the bitmap $B^{(1)}$ is set to zero, then the corresponding value for $i_{1,1}$ is restricted (or not used) for PMI ($i_1$ and $i_2$) reporting. Likewise, a bit $b_i^{(2)}$ in the bitmap $B^{(2)}$ is set to zero, then the corresponding value for $i_{1,2}$ is restricted (or not used) for PMI ($i_1$ and $i_2$) reporting.

For 1D port layouts ($N_2=1$), the bitmap $B^{(1)}$ restricts the values for $q_1$ (since $q_2=0$) and the bitmap $B^{(2)}$ restricts the values for $n_1^{(i)}$ (since $n_2^{(i)}=0$) according to one of Alt 2A and Alt 2B; therefore $K_1=O_1$ and $K_2=N_1$ or $\binom{N_1}{L}$.

For 2D port layouts ($N_2>1$), at least one of the alternatives, Alt 1A-0, Alt 1A-1, and Alt1B is used to restrict the values for $i_{1,1}$. To restrict the values for $i_{1,2}$, at least one of the alternatives, Alt 2C-0, Alt 2C-1, Alt 2D-0, and Alt 2D-1, is used. One of Alt 1A-0, Alt 1A-1, and Alt1B for $i_{1,1}$ and/or one of Alt 2C-0, Alt 2C-1, Alt 2D-0, and Alt 2D-1 for $i_{1,2}$ are/is either fixed in the specification or configured via higher layer RRC or more dynamic MAC CE based or (UL-related or DL-related) DCI signaling.

In one embodiment 4, a UE is configured with beam-level CBSR via higher layer (e.g. RRC) signaling of a bitmap, $B=b_0b_1b_2 \ldots b_{K-1}$, of length K to jointly restrict the values of the first PMI component pair $(i_{1,1}, i_{1,2})$ (indicating $q_1$ and $q_2$, and L beam selection). If a bit $b_i$ in the bitmap B is set to zero, then the corresponding value for the pair $(i_{1,1}, i_{1,2})$ is restricted (or not used) for PMI ($i_1$ and $i_2$) reporting.

For 1D port layouts ($N_2=1$), the bitmap B restricts the values. At least one of the following alternatives is used. In one example of Alt 4A, the bitmap B restricts values for $q_1$ and $n_1^{(i)}$ for all i=0, 1, . . . , L−1 (since $q_2=0$, $n_2^{(i)}=0$), hence $K=O_1N_1$. In one example of Alt 4B, the bitmap B restricts the values for $q_1$ and $i_{1,2}$. If $i_{1,2}$ indicates L beams jointly, then the number of L beam combinations out of $N_1$ beams is $$\binom{N_1}{L},$$

and hence $$K = O_1\binom{N_1}{L}.$$

One of Alt 4A and Alt 4B is either fixed in the specification or configured via higher layer RRC or more dynamic MAC CE based or (UL-related or DL-related) DCI signaling.

For 2D port layouts ($N_2>1$), at least one of the following alternatives is used to restrict the values for $q_1$, $q_2$, $n_1^{(i)}$ and $n_2^{(i)}$.

In one example of Alt 4C, independent restriction for $q_1$ and $q_2$, and joint restriction for $n_1^{(i)}$ and $n_2^{(i)}$ according to at least one of the following alternatives. In one instance of Alt 4C-0, the bitmap $B=B_1B_2$ or $B_2B_1$ comprises two separate bitmaps $B_1$ and $B_2$ to restrict the values for $(q_1, n_1^{(i)}, n_2^{(i)})$ and $q_2$, respectively, where the bitmap $B_1$ is of length $N_1N_2O_1$ and the bitmap $B_2$ is of length $O_2$. So, $K=N_1N_2O_1+O_2$. In one instance of Alt 4C-1, the bitmap $B=B_1B_2$ or $B_2B_1$ comprises two separate bitmaps $B_1$ and $B_2$ to restrict the values for $q_1$ and $(q_2, n_1^{(i)}, n_2^{(i)})$, respectively, where the bitmap $B_1$ is of length $O_1$ and the bitmap $B_2$ is of length $N_1N_2O_2$. So, $K=O_1+N_1N_2O_2$. In one instance of Alt 4C-2, the bitmap $B=B_1B_2$ or $B_2B_1$ comprises two separate bitmaps $B_1$ and $B_2$ to restrict the values for $(q_1, i_{1,2})$ and $q_2$, respectively, where the bitmap $B_1$ is of length $$\binom{N_1N_2}{L}O_1$$

and the bitmap $B_2$ is of length $$O_2. \text{ So, } K = \binom{N_1N_2}{L}O_1 + O_2.$$

In one instance of Alt 4C-3, the bitmap $B=B_1B_2$ or $B_2B_1$ comprises two separate bitmaps $B_1$ and $B_2$ to restrict the values for $q_1$ and $(q_2, i_{1,2})$, respectively, where the bitmap $B_1$ is of length $O_1$ and the bitmap $B_2$ is of length $$\binom{N_1N_2}{L}O_2. \text{ So, } K = O_1 + \binom{N_1N_2}{L}O_2.$$

In one example of Alt 4D: joint restriction for $q_1$ and $q_2$, and independent restriction for $n_1^{(i)}$ and $n_2^{(i)}$ according to at least one of the following alternatives is achieved. In one instance of Alt 4D-0, the bitmap $B=B_1B_2$ or $B_2B_1$ comprises two separate bitmaps $B_1$ and $B_2$ to restrict the values for $(q_1, q_2, n_1^{(i)})$ and $n_2^{(i)}$, respectively, where the bitmap $B_1$ is of length $O_1O_2N_1$ and the bitmap $B_2$ is of length $N_2$. So, $K=O_1O_2N_1+N_2$. In one instance of Alt 4D-1, the bitmap $B=B_1B_2$ or $B_2B_1$ comprises two separate bitmaps $B_1$ and $B_2$ to restrict the values for $n_1^{(i)}$ and $(q_1, q_2, n_2^{(i)})$, respectively, where the bitmap $B_1$ is of length $N_1$ and the bitmap $B_2$ is of length $O_1O_2N_2$. So, $K=N_1+O_1O_2N_2$.

In one example of Alt 4E, joint restriction for $q_1$ and $q_2$, and joint restriction for $n_1^{(i)}$ and $n_2^{(i)}$ according to at least one of the following alternatives is achieved. In one instance of Alt 4E-0, the bitmap B restricts the values for $(q_1, q_2, n_1^{(i)}, n_2^{(i)})$, hence $K=O_1O_2N_1N_2$. In one instance of Alt 4E-1, the bitmap B restricts the values for $(q_1, q_2, i_{1,2})$, hence $$K = O_1O_2\binom{N_1N_2}{L}.$$

One of Alt 4C-0, . . . Alt 4C-3, Alt 4D-0, Alt 4D-1, Alt 4E-0, and Alt 4E-1 is either fixed in the specification or configured via higher layer RRC or more dynamic MAC CE based or (UL-related or DL-related) DCI signaling.

In one embodiment 5, a UE is configured with beam-level CBSR via higher layer (e.g. RRC) signaling of a bitmap $B=B_1B_2$ or $B_2B_1$, where one part of the bitmap $B_1=b_0b_1b_2 \ldots b_{K_1-1}$ has a fixed length $K_1$ and restricts the values of the first PMI component $i_{1,1}$ or $(q_1, q_2)$ that indicates a beam group $G(q_1, q_2)$ according to at least one alternative in the aforementioned embodiment 1. For 1D port layouts ($N_2=1$), $q_2=0$ and $q_1$ indicates a beam group $G(q_1, q_2)$ comprising $N_1$ orthogonal DFT beams $\{q_1+O_1n_1: n_1=0, 1, \ldots, N_1-1\}$. The range of values for $q_1$ is $\{0, 1, \ldots, O_1-1\}$. The bitmap $B_1$ restricts the values for $q_1$ and hence $K_1=O_1$. For 2D port layouts ($N_2>1$), $(q_1, q_2)$ indicates a beam group $G(q_1, q_2)$ comprising $N_1N_2$ orthogonal DFT beams $\{q_1+O_1n_1, q_2+O_2n_2): n_1=0, 1, \ldots, N_1-1, n_2=0, 1, \ldots, N_2-1\}$. The range of values for $q_1$ is $\{0, 1, \ldots, O_1-1\}$ and the range of values for $q_2$ is $\{0, 1, \ldots, O_2-1\}$. The bitmap $B_1$ restricts the values for $(q_1, q_2)$ and hence $K_1=O_1O_2$.

The another part of the bitmap $B_2$ has a length that depends on the number (P) of values for $i_{1,1}$ or $(q_1, q_2)$ that are restricted (e.g. set to 0) via the first bitmap $B_1$. In particular, $B_2=B^{(1)}B^{(2)} \ldots B^{(P)}$ is a concatenation of P bitmaps, where the i-th bitmap $B^{(i)}=b_0^{(i)}b_1^{(i)} \ldots b_{K_2-1}^{(i)}$ and $K_2=N_1N_2$. The i-th bitmap B(i) restricts the values of the first PMI component $i_{1,2}$ (indicating $n_1^{(i)}$ and $n_2^{(i)}$ for L beam selection) corresponding to the i-th restricted value for $i_{1,1}$ or $(q_1, q_2)$, i.e., $B^{(i)}$ restricts the DFT beams in the beam group $G(q_1, q_2)$ corresponding to the i-th restricted beam group indicator $(q_1, q_2)$. The length of the bitmap $B_2$ is $K_2=PN_1N_2$, and therefore the length of the bitmap B is $K=K_1+K_2=O_1+PN_1$ for 1D port layouts ($N_2=1$) and $O_1O_2+PN_1N_2$ for 2D port layouts ($N_2>1$).

The value P is either fixed in the specification (e.g. P=1, 2 or 4) or configured via higher layer RRC or more dynamic MAC CE based or (UL-related or DL-related) DCI signaling.

For 2D port layout ($N_2>1$), to determine the bitmap $B_2$, the candidate $(q_1, q_2)$ values are sorted or numbered according to at least one of the following schemes. In one example of scheme 0, starting from $(q_1, q_2)=(0,0)$, the candidate $(q_1, q_2)$ values are sorted or numbered sequentially 0 to $O_1O_2-1$ first in the 1st dimension, then in the 2nd dimension. A given $(q_1,q_2)$ is sorted or numbered as $q=O_1q_2+q_1$.

In one example of scheme 1, starting from $(q_1, q_2)=(0,0)$, the candidate $(q_1, q_2)$ values are sorted or numbered sequentially 0 to $O_1O_2-1$ first in the 2nd dimension, then in the 1st dimension. A given $(q_1,q_2)$ is sorted or numbered as $q=O_2q_1+q_2$.

Figure 13:
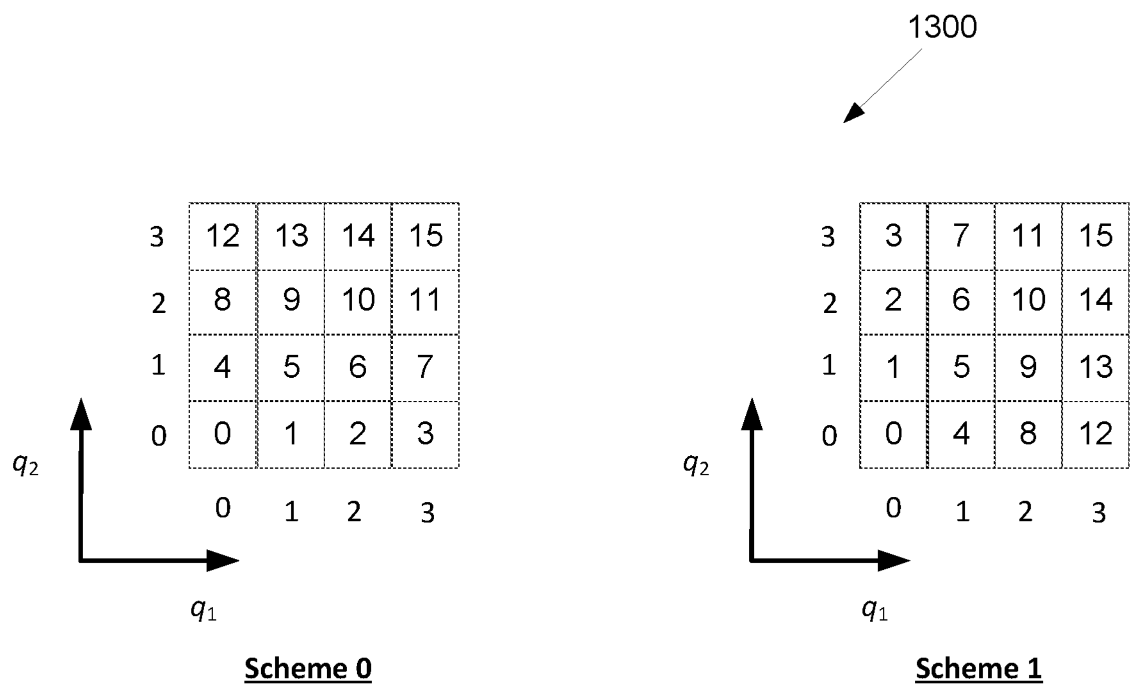
FIG. 13 illustrates an example sorting scheme according to embodiments of the present disclosure.

FIG. 13 illustrates an example sorting scheme 1300 according to embodiments of the present disclosure. The embodiment of the sorting scheme 1300 illustrated in FIG. 13 is for illustration only. FIG. 13 does not limit the scope of this disclosure to any particular implementation.

The sorted indices q belongs to $\{0, 1, \ldots, O_1O_2-1\}$. An illustration of the two sorting (numbering) schemes is shown in FIG. 13. Two examples for numbering are also shown for $(q_1, q_2)=(0, 1)$ and $(1, 2)$, which are numbered as 4 and 9 respectively according to Scheme 0 and as 1 and 6 respectively according to Scheme 1.

In a sub-embodiment, if P is fixed, then the number of $(q_1, q_2)$ values that are restricted are fixed, hence instead of length $K_1=O_1$ or $O_1O_2$, the length of the bitmap $B_1$ can be reduced to $$K_1 = \left\lceil \log_2\binom{O_1}{P} \right\rceil$$

bits for 1D port layout and $$K_1 = \left\lceil \log_2\binom{O_1O_2}{P} \right\rceil$$

bits for 2D port layouts, or alternatively, $$K_1 = \left\lceil \log_2\binom{O_1O_2}{P} \right\rceil$$

for both 1D and 2d port layouts, where $(O_1, O_2)=(4, 1)$ for 1D port layouts, and $(O_1, O_2)=(4, 4)$ for 2D port layouts. For example, for P=4 and $O_1=4$, the length is $K_1=0$ (i.e., $B_1$ is not indicated) for 1D port layout, and for P=4 and $O_1=O_2=4$, the length is $K_1=11$ bits for 2D port layout.

Alternatively, in another sub-embodiment, if P is fixed, then CBSR is configured via $B_1$ and $B_2$, where $B_1$ is a length- $$\left\lceil \log_2\binom{O_1O_2}{P} \right\rceil$$

indicator which selects P beam groups $G(r_1, r_2)$ for further restriction; $B_2=B^{(1)}B^{(2)} \ldots B^{(P)}$, where $B^{(i)}$ is as explained in the aforementioned embodiment 5; P=4; $(O_1, O_2)=(4, 1)$ for 1D port layouts ($N_2=1$), and $(O_1, O_2)=(4, 4)$ for 2D port layouts ($N_2>1$); and Total length of $B_1$ and $B_2$ is $$\left\lceil \log_2 \binom{O_1 O_2}{P} \right\rceil + PN_1N_2.$$

Note that $K_1=0$ for 1D port layouts, i.e., CBSR is configured via $B_2$ for 1D port layouts, and via both $B_1$ and $B_2$ for 2D port layouts.

In one embodiment 6, which is a variation of the aforementioned embodiment 5, $N_1O_1$ DFT beams for 1D antenna port layouts or $N_1N_2O_1O_2$ DFT beams for 2D antenna port layouts are partitioned into beam groups $G(r_1, r_2)$, where $(r_1, r_2)$ is a beam group indicator. A UE is configured with beam-level CBSR via higher layer (e.g. RRC) signaling of a bitmap $B=B_1B_2$ or $B_2B_1$, where one part of the bitmap $B_1=b_0b_1b_2 \ldots b_{K_1-1}$ has a fixed length $K_1$ and restricts the values of the beam group indicator $(r_1, r_2)$ as follows.

For 1D port layouts ($N_2=1$), $r_2=0$ and $r_1$ indicates a beam group $G(r_1, r_2)$ comprising $O_1$ adjacent or non-orthogonal DFT beams $\{r_1+x_1: x_1=0, 1, \ldots, O_1-1\}$. The range of values for $r_1$ is $\{0, O_1, \ldots, (N_1-1)O_1\}$. The bitmap $B_1$ restricts the values for $r_1$ and hence $K_1=N_1$.

For 2D port layouts ($N_2>1$), $(r_1, r_2)$ indicates a beam group $G(r_1, r_2)$ comprising $O_1O_2$ adjacent or non-orthogonal DFT beams $\{(r_1+x, r_2+x_2): x_1=0, 1, \ldots, O_1-1, x_2=0, 1, \ldots, O_2-1\}$. The range of values for $r_1$ is $\{0, O_1, \ldots, (N_1-1)O_1\}$ and the range of values for $r_2$ is $\{0, O_2, \ldots, (N_2-1)O_2\}$. The bitmap $B_1$ restricts the values for $(r_1, r_2)$ and hence $K_1=N_1N_2$.

The another part of the bitmap $B_2$ has a length that depends on the number (P) of values for $(r_1, r_2)$ that are restricted (e.g. set to 0) via the first bitmap $B_1$. In particular, $B_2=B^{(1)}B^{(2)} \ldots B^{(P)}$ is a concatenation of P bitmaps, where the i-th bitmap $B^{(i)}=b_0^{(i)}b_1^{(i)} \ldots b_{K_2-1}^{(i)}$ and $K_2=O_1O_2$ for 2D port layouts and $O_1$ for 1D port layouts. The i-th bitmap $B^{(i)}$ restricts the DFT beams in the beam group $G(r_1, r_2)$ corresponding to the i-th restricted beam group indicator $(r_1, r_2)$. The length of the bitmap $B_2$ is $K_2=PO_1O_2$ for 2D port layouts and $PO_1$ for 1D port layouts, and therefore the length of the bitmap B is $K=K_1+K_2=N_1+PO_1$ for 1D port layouts ($N_2=1$) and $N_1N_2+PO_1O_2$ for 2D port layouts ($N_2>1$).

The value P is either fixed in the specification (e.g. P=1, 2 or 4) or configured via higher layer RRC or more dynamic MAC CE based or (UL-related or DL-related) DCI signaling.

In one sub-embodiment, if P is fixed, then the number of $(r_1, r_2)$ values that are restricted are fixed, hence instead of length $K_1=N_1$ or $N_1N_2$, the length of the bitmap $B_1$ can be reduced to $$K_1 = \left\lceil \log_2 \binom{N_1}{P} \right\rceil$$

bits for 1D port layout and $$K_2 = \left\lceil \log_2 \binom{N_1N_2}{P} \right\rceil$$

bits for 2D port layouts, or alternatively, $$K_1 = \left\lceil \log_2 \binom{N_1N_2}{P} \right\rceil$$

for both 1D and 2D port layouts since $N_2=1$ for 1D port layouts. For example, for P=4 and $N_1=4$, the length is $K_1=0$ (i.e., $B_1$ is not indicated) for 1D port layout, and for P=4 and $N_1=N_2=4$, the length is $K_1=11$ bits for 2D port layout. In another example, P=2 if $N_1=2$ and $N_2=1$.

Alternatively, if P is fixed, then CBSR is configured via $B_1$ and $B_2$, where: $B_1$ is a length- $$\left\lceil \log_2 \binom{N_1N_2}{P} \right\rceil$$

indicator which selects P beam groups $G(r_1,r_2)$ for further restriction; $B_2$ $B^{(1)}B^{(2)} \ldots B^{(P)}$, where $B^{(i)}$ is as explained in the embodiment 6; P=min(4, $N_1N_2$); and Total length of $B_1$ and $B_2$ is $$\left\lceil \log_2 \binom{N_1N_2}{P} \right\rceil + PO_1O_2.$$

Note that $K_1=0$ if $P \geq N_1N_2$, i.e., CBSR is configured via $B_2$ if $P \geq N_1N_2$, and via both $B_1$ and $B_2$ otherwise.

For 2D port layout ($N_2>1$), to determine the bitmap $B_2$, the candidate $(r_1, r_2)$ values are sorted or numbered according to at least one of the numbering schemes (Scheme 0 and 1) explained in the aforementioned embodiment 5.

In a variation of this embodiment (6A), a UE is configured with beam-level CBSR via higher layer (e.g. RRC) signaling of a bitmap $B=B_1$, where $B_1$ is defined as in embodiment 6. That is, CBSR is used to restrict the values of the beam group indicator $(r_1, r_2)$ using the bitmap $B_1$ of length $N_1N_2$.

In a variation of this embodiment (6B), a UE is configured with beam-level CBSR via higher layer (e.g. RRC) signaling of a bitmap $B=B_1$, where $B_1$ is used to restrict the values of the beam group indicator $(r_1, r_2)$ using the bitmap $B_1$ as follows.

For 1D port layouts ($N_2=1$), $r_2=0$ and $r_1$ indicates a beam group $G(r_1, r_2)$ comprising $O_1$ adjacent or non-orthogonal DFT beams $\{r_1+x_1: x_1=0, 1, \ldots, O_1-1\}$. The range of values for $r_1$ is $\{0, s_1, 2s_1 \ldots, N_1O_1-s_1\}$. The bitmap $B_1$ restricts the values for $r_1$ and hence $$K_1 = \frac{N_1 O_1}{s_1}.$$

For 2D port layouts ($N_2>1$), $(r_1, r_2)$ indicates a beam group $G(r_1, r_2)$ comprising $O_1O_2$ adjacent or non-orthogonal DFT beams $\{r+x_1, r_2+x_2): x_1=0, 1, \ldots, O_1-1, x_2=0, 1, \ldots, O_2-1\}$. The range of values for $r_1$ is $\{0, s_1, 2s_1 \ldots, N_1O_1-s_1\}$ and the range of values for $r_2$ is $\{0, S_2, 2s_2 \ldots, N_2O_2-s_2\}$. The bitmap $B_1$ restricts the values for $(r_1, r_2)$ and hence $$K_1 = \frac{N_1 N_2 O_1 O_2}{s_1 s_2}.$$

In a variation of the embodiment (6C), a UE is configured with beam-level CBSR via higher layer (e.g. RRC) signaling of a bitmap $B=B_1$, where $B_1$ is used to restrict the values of the beam group indicator $(r_1, r_2)$ using the bitmap $B_1$ as follows.

For 1D port layouts ($N_2=1$), $r_2=0$ and $r_1$ indicates a beam group $G(r_1, r_2)$ comprising $O_1$ adjacent or non-orthogonal DFT beams $\{s_1r_1+x_1: x_1=0, 1, \ldots, O_1-1\}$. The range of values for $r_1$ is $$\left\{0, 1, 2, \ldots, \frac{N_1O_1}{s_1}-1\right\}.$$

The bitmap $B_1$ restricts the values for $r_1$ and hence $$K_1=\frac{N_1O_1}{s_1}.$$

For 2D port layouts ($N_2>1$), $(r_1, r_2)$ indicates a beam group $G(r_1, r_2)$ comprising $O_1O_2$ adjacent or non-orthogonal DFT beams $\{s_1r_1+x_1, s_2r_2+x_2):x_1=0, 1, \ldots, O_1-1, x_2=0, 1, \ldots, O_2-1\}$. The range of values for $r_1$ is $$\left\{0, 1, 2, \ldots, \frac{N_1O_1}{s_1}-1\right\}$$

and the range of values for $r_2$ is $$\left\{0, 1, 2, \ldots, \frac{N_1O_1}{s_1}-1\right\}.$$

The bitmap $B_1$ restricts the values for $(r_1,r_2)$ and hence $$K_1=\frac{N_1N_2O_1O_2}{s_1s_2}.$$

In embodiments 6B and 6C, $s_1$ and $s_2$ respectively are the spacing between two consecutive beam groups $G(r_1, r_2)$. The value of $(s_1, s_2)$ is fixed. A few example values for $(s_1, s_2)$ are (1,1), (2,1), $(N_1, 1)$, and $(O_1, 1)$ for 1D port layouts ($N_2=1$), and (1,1), (2,1), (1,2), (2,2), $(N_1, N_2)$, and $(O_1, O_2)$ for 2D port layouts ($N_2>1$). Only one of these example values may be supported in the specification. Also, the candidate $(r_1, r_2)$ values are sorted or numbered according to at least one of the two numbering schemes in the aforementioned embodiment 5.

In the aforementioned embodiment 6A, 6B, and 6C, all DFT beams comprising a beam group $G(r_1, r_2)$ associated with a restricted value for $(r_1, r_2)$ are restricted (hence not used) for PMI reporting.

In one embodiment 7, which is a variation of the aforementioned embodiment 5, $N_1O_1$ DFT beams for 1D antenna port layouts or $N_1N_2O_1O_2$ DFT beams for 2D antenna port layouts are partitioned into beam groups $G(r_1, r_2)$, where $(r_1, r_2)$ is a beam group indicator. A UE is configured with beam-level CBSR via higher layer (e.g. RRC) signaling of a bitmap $B=B_1B_2$ or $B_2B_1$, where one part of the bitmap $B_1=b_0b_1b_2 \ldots b_{K_1-1}$ has a fixed length $K_1$ and restricts the values of the beam group indicator $(r_1, r_2)$ as follows.

For 1D port layouts ($N_2=1$), $r_2=0$ and $r_1$ indicates a beam group $G(r_1, r_2)$ comprising $N_1$ adjacent or non-orthogonal DFT beams $\{r_1+x_1: x_1=0, 1, \ldots, N_1-1\}$. The range of values for $r_1$ is $\{0, N_1, \ldots, (O_1-1)N_1\}$. The bitmap $B_1$ restricts the values for $r_1$ and hence $K_1=O_1$.

For 2D port layouts ($N_2>1$), $(r_1, r_2)$ indicates a beam group $G(r_1, r_2)$ comprising $N_1N_2$ adjacent or non-orthogonal DFT beams $\{r_1+x, r_2+x_2): x_1=0, 1, \ldots, N_1-1, x_2=0, 1, \ldots, N_2-1\}$. The range of values for $r_1$ is $\{0, N_1, \ldots, (O_1-1)N_1\}$ and the range of values for $r_2$ is $\{0, N_2, \ldots, (O_2-1)N_2\}$. The bitmap $B_1$ restricts the values for $(r_1, r_2)$ and hence $K_1=O_1O_2$.

The another part of the bitmap $B_2$ has a length that depends on the number (P) of values for $(r_1, r_2)$ that are restricted (e.g. set to 0) via the first bitmap $B_1$. In particular, $B_2=B^{(1)}B^{(2)} \ldots B^{(P)}$ is a concatenation of P bitmaps, where the i-th bitmap $B^{(i)}=b_0^{(i)}b_1^{(i)} \ldots b_{K_2-1}^{(i)}$ and $K_2=N_1N_2$ for 2D port layouts and $N_1$ for 1D port layouts. The i-th bitmap $B^{(i)}$ restricts the DFT beams in the beam group $G(r_1, r_2)$ corresponding to the i-th restricted beam group indicator $(r_1, r_2)$. The length of the bitmap $B_2$ is $K_2=PN_1N_2$ for 2D port layouts and $PN_1$ for 1D port layouts, and therefore the length of the bitmap B is $K=K_1+K_2=O_1+PN_1$ for 1D port layouts ($N_2=1$) and $O_1O_2+PN_1N_2$ for 2D port layouts ($N_2>1$).

The value P is either fixed in the specification (e.g. P=1, 2 or 4) or configured via higher layer RRC or more dynamic MAC CE based or (UL-related or DL-related) DCI signaling.

In one sub-embodiment, if P is fixed, then the number of $(r_1, r_2)$ values that are restricted are fixed, hence instead of length $K_1=O_1$ or $O_1O_2$, the length of the bitmap $B_1$ can be reduced to $$K_1=\left\lceil \log_2\binom{O_1}{P}\right\rceil$$

bits for 1D port layout and $$K_2=\left\lceil \log_2\binom{O_1O_2}{P}\right\rceil$$

bits for 2D port layouts, or alternatively, $$K_1=\left\lceil \log_2\binom{O_1O_2}{P}\right\rceil$$

for both 1D and 2d port layouts, where $(O_1, O_2)=(4, 1)$ for 1D port layouts, and $(O_1, O_2)=(4, 4)$ for 2D port layouts. For example, for P=4 and $O_1=4$, the length is $K_1=0$ (i.e., $B_1$ is not indicated) for 1D port layout, and for P=4 and $O_1=O_2=4$, the length is $K_1=11$ bits for 2D port layout.

Alternatively, in another sub-embodiment, if P is fixed, then CBSR is configured via $B_1$ and $B_2$, where: $B_1$ is a length- $$\left\lceil \log_2\binom{O_1O_2}{P}\right\rceil$$

indicator which selects P beam groups $G(r_1, r_2)$ for further restriction; $B_2=B^{(1)}B^{(2)} \ldots B^{(P)}$, where $B^{(i)}$ is as explained in the aforementioned embodiment 5; P=4; $(O_1, O_2)=(4, 1)$ for 1D port layouts ($N_2=1$), and $(O_1, O_2)=(4, 4)$ for 2D port layouts ($N_2>1$); and total length of $B_1$ and $B_2$ is $$\left\lceil \log_2\binom{O_1 O_2}{P} \right\rceil + P N_1 N_2.$$

Note that $K_1=0$ for 1D port layouts, i.e., CBSR is configured via $B_2$ for 1D port layouts, and via both $B_1$ and $B_2$ for 2D port layouts.

For 2D port layout ($N_2>1$), to determine the bitmap $B_2$, the candidate $(r_1, r_2)$ values are sorted or numbered according to at least one of the numbering schemes (Scheme 0 and 1) explained in the aforementioned embodiment 5.

In a variation of this embodiment (7A), a UE is configured with beam-level CBSR via higher layer (e.g. RRC) signaling of a bitmap $B=B_1$, where $B_1$ is defined as in the embodiment 7. That is, CBSR is used to restrict the values of the beam group indicator $(r_1, r_2)$ using the bitmap $B_1$ of length $O_1$ for 1D port layouts and $O_1O_2$ for 2D port layouts.

In a variation of this embodiment (7B), a UE is configured with beam-level CBSR via higher layer (e.g. RRC) signaling of a bitmap $B=B_1$, where $B_1$ is used to restrict the values of the beam group indicator $(r_1, r_2)$ using the bitmap $B_1$ as follows.

For 1D port layouts ($N_2=1$), $r_2=0$ and $r_1$ indicates a beam group $G(r_1, r_2)$ comprising $N_1$ adjacent or non-orthogonal DFT beams $\{r_1+x_1: x_1=0, 1, \ldots, N_1-1\}$. The range of values for $r_1$ is $\{0, s_1, 2s_1 \ldots, N\ O_1-s_1\}$. The bitmap $B_1$ restricts the values for $r_1$ and hence $$K_1 = \frac{N_1 O_1}{s_1}.$$

For 2D port layouts ($N_2>1$), $(r_1, r_2)$ indicates a beam group $G(r_1, r_2)$ comprising $N_1N_2$ adjacent or non-orthogonal DFT beams $\{(r_1+x_1, r_2+x_2): x_1=0, 1, \ldots, N_1-1, x_2=0, 1, \ldots, N_2-1\}$. The range of values for $r_1$ is $\{0, s_1, 2s_1 \ldots, N_1O_1-s_1\}$ and the range of values for $r_2$ is $\{0, s_2, 2s_2 \ldots, N_2O_2-s_2\}$. The bitmap $B_1$ restricts the values for $(r_1, r_2)$ and hence $$K_1 = \frac{N_1 N_2 O_1 O_2}{s_1 s_2}.$$

In a variation of this embodiment (7C), a UE is configured with beam-level CBSR via higher layer (e.g. RRC) signaling of a bitmap $B=B_1$, where $B_1$ is used to restrict the values of the beam group indicator $(r_1, r_2)$ using the bitmap $B_1$ as follows.

For 1D port layouts ($N_2=1$), $r_2=0$ and $r_1$ indicates a beam group $G(r_1, r_2)$ comprising $N_1$ adjacent or non-orthogonal DFT beams $\{s_1r_1+x_1: x_1=0, 1, \ldots, N_1-1\}$. The range of values for $r_1$ is $$\left\{0, 1, 2 \ldots, \frac{N_1 O_1}{s_1} - 1\right\}.$$

The bitmap $B_1$ restricts the values for $r_1$ and hence $$K_1 = \frac{N_1 O_1}{s_1}.$$

For 2D port layouts ($N_2>1$), $(r_1, r_2)$ indicates a beam group $G(r_1, r_2)$ comprising $N_1N_2$ adjacent or non-orthogonal DFT beams $\{(s_1r_1+X_1, S_2r_2+x_2): x_1=0, 1, \ldots, N_1-1, x_2=0, 1, \ldots, N_2-1\}$. The range of values for $r_1$ is $$\left\{0, 1, 2 \ldots, \frac{N_1 O_1}{s_1} - 1\right\}$$

and the range of values for $r_2$ is $$\left\{0, 1, 2 \ldots, \frac{N_2 O_2}{s_2} - 1\right\}.$$

The bitmap $B_1$ restricts the values for $(r_1, r_2)$ and hence $$K_1 = \frac{N_1 N_2 O_1 O_2}{s_1 s_2}.$$

In embodiments 7B and 7C, $s_1$ and $s_2$ respectively are the spacing between two consecutive beam groups $G(r_1, r_2)$. The value of $(s_1, S_2)$ is fixed. A few example values for $(S_1, S_2)$ are (1,1), (2,1), $(N_1, 1)$, and $(O_1, 1)$ for 1D port layouts ($N_2=1$), and (1,1), (2,1), (1,2), (2,2), $(N_1, N_2)$, and $(O_1, O_2)$ for 2D port layouts ($N_2>1$). Only one of these example values may be supported in the specification. Also, the candidate $(r_1, r_2)$ values are sorted or numbered according to at least one of the two numbering schemes in the aforementioned embodiment 5.

In embodiments 7A, 7B, and 7C, all DFT beams comprising a beam group $G(r_1, r_2)$ associated with a restricted value for $(r_1, r_2)$ are restricted (hence not used) for PMI reporting.

In one embodiment 8, in addition to the beam-level CBSR according to at least one of embodiment 1-7, the CBSR is extended to restrict WB amplitude values. In particular, instead of restricting the use of the beams for PMI ($i_1$ and $i_2$) reporting, their WB amplitude values are restricted to the values that are smaller than or equal to the indicated values and the beams can be used for PMI ($i_1$ and $i_2$) reporting.

A UE is configured with CBSR via higher layer (e.g. RRC) signaling of a bitmap, $B=b_0b_1b_2 \ldots b_{K-1}$, of length K to restrict the values of the WB amplitudes for all DFT beams ($N_1O_1$ DFT beam for 1D port layouts and $N_1N_2O_1O_2$ DFT beams for 2D port layouts). An example of the WB amplitude codebook is shown in TABLE 1.

TABLE 1

Mapping of elements of $i_{1,4,l}$: index $k_{l,i}^{(1)}$ to WB amplitude $p_{l,i}^{(1)}$

| Bits | $k_{l,i}^{(1)}$ | $p_{l,i}^{(1)}$ |
|---|---|---|
| 000 | 0 | 0 |
| 001 | 1 | $\sqrt{1/64}$ |
| 010 | 2 | $\sqrt{1/32}$ |
| 011 | 3 | $\sqrt{1/16}$ |
| 100 | 4 | $\sqrt{1/8}$ |

TABLE 1-continued

| Mapping of elements of $i_{1,4,l}$: index $k_{l,i}^{(1)}$ to WB amplitude $p_{l,i}^{(1)}$ | | |
|---|---|---|
| Bits | $k_{l,i}^{(1)}$ | $p_{l,i}^{(1)}$ |
| 101 | 5 | $\sqrt{1/4}$ |
| 110 | 6 | $\sqrt{1/2}$ |
| 111 | 7 | 1 |

At least one of the following alternatives is used.

In one embodiment of Alt 8A, 3 bits are used to restrict the WB amplitude of each DFT beam according to at least one of the following two examples.

In one example of Ex 8A-0, WB amplitudes for all DFT beams are restricted, and hence $K=3O_1N_1$ for 1D port layouts and $3O_1O_2N_1N_2$ for 2D port layouts. Starting from the left the first three bits $b_0b_1b_2$ are used to restrict the WB amplitude of DFT beam (0, 0), the next three bits $b_3b_4b_5$ are used to restrict the WB amplitude of DFT beam (1, 0), and so on, where the sequence of the three bits $b_0b_1b_2$, $b_3b_4b_5$, . . . , $b_{K-3}b_{K-2}b_{K-1}$ correspond to the sequence of maximum WB amplitude values (according to TABLE 1) that DFT beam (0, 0), DFT beam (1, 0), . . . , DFT beam ($N_1O_1-1$, $O_2N_2-1$) can take for PMI reporting.

In one example of Ex 8A-1, $B=B_1B_2$ or $B_2B_1$ where the bitmap $B_1$ is used to indicate the DFT beams whose WB amplitudes are restricted, and the bitmap $B_2$ is used to indicate the corresponding restricted WB amplitude values, where the WB amplitude restriction is explained as in Ex 8A-0. So, $K=O_1N_1+3Q$ for 1D port layouts and $O_1O_2N_1N_2+3Q$ for 2D port layouts, where Q is the number of DFT beams whose WB amplitudes are restricted using the bitmap $B_1$. For the bitmap $B_2$, the DFT beams are numbered (sorted) according to one of the numbering schemes in the aforementioned embodiment 5.

In one example of Alt 8B, 1 bit is used to restrict the WB amplitude of each DFT beam, therefore, the length of the bitmap is $K=O_1O_2N_1N_2$. If bit $b_i$ in the bitmap B is set to 1, then the corresponding (i-th) DFT beam is not restricted (hence used) for PMI reporting, and if bit $b_i$ in the bitmap B is set to 0, then the WB amplitude of the corresponding (i-th) DFT beam is restricted to be one of the R smallest amplitude values in TABLE 1. Alternatively, if bit $b_i$ in the bitmap B is set to 0, then the corresponding (i-th) DFT beam is not restricted (hence used) for PMI reporting, and if bit $b_i$ in the bitmap B is set to 1, then the WB amplitude of the corresponding (i-th) DFT beam is restricted to be one of the R smallest amplitude values in TABLE 1. An example of 1-bit WB amplitude restriction is shown in TABLE 2.

TABLE 2

| 1-bit WB amplitude restriction | |
|---|---|
| Bit $b_i$ | WB amplitude index $k_{l,i}^{(1)}$ in TABLE 1 |
| 0 | 0 to R − 1 |
| 1 | 0 to 7 |

At least one of the following two examples is used for R.

In one example of Ex 8B-0, R is fixed, e.g. R=4 which implies that the WB amplitude is restricted to be a value in $\{0, \sqrt{1/64}, \sqrt{1/32}, \sqrt{1/16}\}$.

In one example of Ex 8B-1, R is configured via 1-bit RRC signaling, where R belongs to either {2, 4} or {1, 2}, where R=1, 2, and 4 correspond to $\{0\}$, $\{0, \sqrt{1/64}\}$, and $\{0, \sqrt{1/64}, \sqrt{1/32}, \sqrt{1/16}\}$, respectively.

In one example of Alt 8C, 2 bits are used to restrict the set of WB amplitude values for each DFT beam according to at least one of the following two examples, where the set of amplitude values can be multiple.

In one instance of Ex 8C-0, WB amplitudes for all DFT beams are restricted, and hence $K=2O_1N_1$ for 1D port layouts and $2O_1O_2N_1N_2$ for 2D port layouts. Starting from the left the first two bits $b_0b_1$ are used to restrict the WB amplitude of DFT beam (0, 0), the next three bits $b_2b_3$ are used to restrict the WB amplitude of DFT beam (1, 0), and so on, where the sequence of the two bits $b_0b_1$, $b_2b_3$, $b_4b_5$, . . . , $b_{K-2}b_{K-1}$ correspond to the sequence of maximum WB amplitude values (according to TABLE 1) that DFT beam (0, 0), DFT beam (1, 0), . . . , DFT beam ($N_1O_1-1$, $O_2N_2-1$) can take for PMI reporting.

In one instance of Ex 8C-1, $B=B_1B_2$ or $B_2B_1$ where the bitmap $B_1$ is used to indicate the DFT beams whose WB amplitudes are restricted, and the bitmap $B_2$ is used to indicate the corresponding restricted WB amplitude values, where the WB amplitude restriction is explained as in Ex 8C-0. So, $K=O_1N_1+2Q$ for 1D port layouts and $O_1O_2N_1N_2+2Q$ for 2D port layouts, where Q is the number of DFT beams whose WB amplitudes are restricted using the bitmap $B_1$. For the bitmap $B_2$, the DFT beams are numbered (sorted) according to one of the numbering schemes in the aforementioned embodiment 5

If bit-pair $b_ib_{i+1}$ in the bitmap B is set to 11, then the corresponding (i-th) DFT beam is not restricted (hence used) for PMI reporting, if bit $b_i$ in the bitmap B is set to 10, then the WB amplitude of the corresponding (i-th) DFT beam is restricted to be one of the $R_2$ smallest amplitude values in TABLE 1, if bit $b_i$ in the bitmap B is set to 01, then the WB amplitude of the corresponding (i-th) DFT beam is restricted to be one of the $R_1$ smallest amplitude values in TABLE 1, and if bit $b_i$ in the bitmap B is set to 00, then the WB amplitude of the corresponding (i-th) DFT beam is restricted to be one of the $R_0$ smallest amplitude values in TABLE 1, where $R_i \geq R_j$ for i>j.

Alternatively, if bit-pair $b_ib_{i+1}$ in the bitmap B is set to 00, then the corresponding (i-th) DFT beam is not restricted (hence used) for PMI reporting, if bit $b_i$ in the bitmap B is set to 01, then the WB amplitude of the corresponding (i-th) DFT beam is restricted to be one of the $R_1$ smallest amplitude values in TABLE 1, if bit $b_i$ in the bitmap B is set to 10, then the WB amplitude of the corresponding (i-th) DFT beam is restricted to be one of the $R_2$ smallest amplitude values in TABLE 1, and if bit $b_i$ in the bitmap B is set to 11, then the WB amplitude of the corresponding (i-th) DFT beam is restricted to be one of the $R_3$ smallest amplitude values in TABLE 1, where $R_i \leq R_j$ for i>j. At least one of the two examples (8B-0 and 8B-1) in Alt 8B is used for R. An example of 2-bit WB amplitude restriction is shown in TABLE 3.

TABLE 3

| 2-bit WB amplitude restriction | | | | | |
|---|---|---|---|---|---|
| | Example 1, $R_i = 2(i+1)$ | | | Example 2 | |
| Bit-pair $b_ib_{i+1}$ | WB amplitude index $k_{l,i}^{(1)}$ in TABLE 1 | WB amplitude index $k_{l,i}^{(1)}$ in TABLE 1 | Max WB amp $p_{l,i}^{(1)}$ | WB amplitude index $k_{l,i}^{(1)}$ in TABLE 1 | Max WB amp $p_{l,i}^{(1)}$ |
| 00 | 0 to $R_0 - 1$ | 0 to 1 | $\sqrt{1/64}$ | 0 | 0 |
| 01 | 0 to $R_1 - 1$ | 0 to 3 | $\sqrt{1/16}$ | 0 to 5 | $\sqrt{1/4}$ |

TABLE 3-continued

| 2-bit WB amplitude restriction | | | | | |
|---|---|---|---|---|---|
| | | Example 1, $R_i = 2(i + 1)$ | | Example 2 | |
| Bit-pair $b_i b_{i+1}$ | WB amplitude index $k_{l,i}^{(1)}$ in TABLE 1 | WB amplitude index $k_{l,i}^{(1)}$ in TABLE 1 | Max WB amp $p_{l,i}^{(1)}$ | WB amplitude index $k_{l,i}^{(1)}$ in TABLE 1 | Max WB amp $p_{l,i}^{(1)}$ |
| 10 | 0 to $R_2 - 1$ | 0 to 5 | $\sqrt{1/4}$ | 0 to 6 | $\sqrt{1/2}$ |
| 11 | 0 to 7 | 0 to 7 | 1 | 0 to 7 | 1 |

In one example of Alt 8D, 2 bits are used to restrict the WB amplitude for each DFT beam to a single amplitude value from TABLE 1 according to at least one of the following two examples: Ex 8D-0, same as Ex 8C-0; and Ex 8D-1: same as Ex 8C-1.

An example of the WB amplitude restriction table for a bit-pair $b_i b_{i+1}$ is shown in TABLE 4.

TABLE 4

| 2-bit WB amplitude restriction | |
|---|---|
| Bit-pair $b_i b_{i+1}$ | WB amplitude value from TABLE 1 |
| 00 | 0 |
| 01 | $\sqrt{1/4} = \sqrt{0.25}$ |
| 10 | $\sqrt{1/2} = \sqrt{0.5}$ |
| 11 | 1 |

In one embodiment 9, which is a combination of the aforementioned embodiment 5 and embodiment 8, a UE is configured with CBSR via higher layer (e.g. RRC) signaling of a bitmap $B=B_1B_2$ or $B_2B_1$, where one part of the bitmap $B_1=b_0b_1b_2 \ldots b_{K_1-1}$ has a fixed length $K_1$ and restricts the values of the first PMI component $i_{1,1}$ or $(q_1, q_2)$ that indicates a beam group $G(q_1, q_2)$ according to at least one alternative in the embodiment 1.

For 1D port layouts ($N_2=1$), $q_2=0$ and $q_1$ indicates a beam group $G(q_1, q_2)$ comprising $N_1$ orthogonal DFT beams $\{q_1+O_1n_1: n_1=0, 1, \ldots, N_1-1\}$. The range of values for $q_1$ is $\{0, 1, \ldots, O_1-1\}$. The bitmap $B_1$ restricts the values for $q_1$ and hence $K_1=O_1$.

For 2D port layouts ($N_2>1$), $(q_1, q_2)$ indicates a beam group $G(q_1, q_2)$ comprising $N_1N_2$ orthogonal DFT beams $\{(q_1+O_1n_1, q_2+O_2n_2): n_1=0, 1, \ldots, N_1-1, n_2=0, 1, \ldots, N_2-1\}$. The range of values for $q_1$ is $\{0, 1, \ldots, O_1-1\}$ and the range of values for $q_2$ is $\{0, 1, \ldots, O_2-1\}$. The bitmap $B_1$ restricts the values for $(q_1, q_2)$ and hence $K_1=O_1O_2$.

The another part of the bitmap $B_2$ has a length that depends on the number (P) of values for $i_{1,1}$ or $(q_1, q_2)$ that are restricted (e.g. set to 0) via the first bitmap $B_1$. In particular, $B_2=B^{(1)}B^{(2)} \ldots B^{(P)}$ is a concatenation of P bitmaps, where the i-th bitmap $B^{(i)}=b_0^{(i)}n_1^{(i)} \ldots b^{(i)}_{K_2-1}$ The i-th bitmap B(i) restricts the WB amplitude values for the DFT beams in the beam group $G(q_1, q_2)$ corresponding to the i-th restricted beam group indicator $(q_1, q_2)$. An example of the WB amplitude codebook is shown in TABLE 1. At least one of the following alternatives is used to restrict WB amplitudes of beams in the beam group $G(q_1, q_2)$.

In one example of Alt 9A, 3 bits is used to restrict the WB amplitude of each DFT beam in the beam group $G(q_1, q_2)$ according to at least one of the following two examples.

In one instance of Ex 9A-0, WB amplitudes for all DFT beams in the beam group $G(q_1, q_2)$ are restricted, and hence $K_2=3N_1$ for 1D port layouts and $3N_1N_2$ for 2D port layouts. The rest of the details are the same as in Ex 8A-0. The overall length of the bitmap B is $K=O_1+3PN_1$ for 1D port layouts and $O_1O_2+3PN_1N_2$ for 2D port layouts.

In one instance of Ex 9A-1, $B_2=B_{21}B_{22}$ or $B_{22}B_{21}$ where the bitmap $B_{21}$ is used to indicate the DFT beams in the beam group $G(q_1, q_2)$ whose WB amplitudes are restricted, and the bitmap $B_{22}$ is used to indicate the corresponding restricted WB amplitude values, where the WB amplitude restriction is explained as in Ex 8A-1. So, $K_2=N_1+3Q$ for 1D port layouts and $N_1N_2+3Q$ for 2D port layouts, where Q is the number of DFT beams whose WB amplitudes are restricted using the bitmap $B_{21}$. For the bitmap $B_2$, the DFT beams are numbered (sorted) according to one of the numbering schemes in the aforementioned embodiment 5. The overall length of the bitmap B is $K=O_1+PN_1+3PQ$ for 1D port layouts and $O_1O_2+3N_1N_2+3PQ$ for 2D port layouts.

In one example of Alt 9B, 1 bit is used to restrict the WB amplitude of each DFT beam in the beam group $G(q_1, q_2)$ according to at least one of the following two examples. Therefore, the length of the bitmap is $K_2=N_1N_2$. If bit $b_1$ in the bitmap B(i) is set to 1, then the corresponding (j-th) DFT beam is not restricted (hence used) for PMI reporting, and if bit $b_1$ in the bitmap B(i) is set to 0, then the WB amplitude of the corresponding (j-th) DFT beam is restricted to be one of the R smallest amplitude values in TALE 1. The overall length of the bitmap B is $K=O_1+PN_1$ for 1D port layouts and $O_1O_2+PN_1N_2$ for 2D port layouts.

In one instance of Ex 9B-0, R is fixed, e.g. R=4 which implies that the WB amplitude is restricted to be a value in $\{0, \sqrt{1/64}, \sqrt{1/32}, \sqrt{1/16}\}$.

In one instance of Ex 9B-1, R is configured via 1-bit RRC signaling, where R belongs to either $\{2, 4\}$ or $\{1, 2\}$, where R=1, 2,and 4 correspond to $\{0\}$, $\sqrt{1/64}$, and $\{0, \sqrt{1/64}, \sqrt{1/32}, \sqrt{1/16}\}$, respectively.

In one example of Alt 9C, 2 bits are used to restrict the set of WB amplitude values for each DFT beam in the beam group $G(q_1, q_2)$ according to at least one of the following two examples, where the set of amplitude values can be multiple.

In one instance of Ex 9C-0, same as Ex 8C-0 except that WB amplitude restriction is performed for the beams in the beam groups $G(q_1, q_2)$ that are restricted via $B_1$. The overall length of the bitmap B is $K=O_1+2PN_1$ for 1D port layouts and $O_1O_2+2PN_1N_2$ for 2D port layouts.

In one instance of Ex 9C-1, same as Ex 8C-1 except that WB amplitude restriction is performed for the beams in the beam groups $G(q_1, q_2)$ that are restricted via $B_1$. The overall length of the bitmap B is $K=O_1+PN_1+2PQ$ for 1D port layouts and $O_1O_2+PN_1N_2+2PQ$ for 2D port layouts.

The rest of the details of Alt 8C are applicable to this alternative also including alternatives and examples. An example of 2-bit WB amplitude restriction is shown in TABLE 3.Alt 9D: 2 bits are used to restrict the WB amplitude for each DFT beam to a single amplitude value from TABLE 1 according to at least one of the following two examples.

In one instance of Ex 9D-0, same as Ex 8D-0 except that WB amplitude restriction is performed for the beams in the beam groups $G(q_1, q_2)$ that are restricted via $B_1$. The overall length of the bitmap B is $K=O_1+2PN_1$ for 1D port layouts and $O_1O_2+2PN_1N_2$ for 2D port layouts.

In one instance of Ex 9D-1, same as Ex 8D-1 except that WB amplitude restriction is performed for the beams in the beam groups $G(q_1, q_2)$ that are restricted via $B_1$. The overall length of the bitmap B is $K=O_1+PN_1+2PQ$ for 1D port layouts and $O_1O_2+PN_1N_2+2PQ$ for 2D port layouts.

The rest of the details of Alt 8D are applicable to this alternative also including alternatives and examples. An example of a 2-bit WB amplitude restriction table for a bit-pair $b_i b_{i+1}$ is shown in TABLE 4.

The value P is either fixed in the specification (e.g. P=1, 2 or 4) or configured via higher layer RRC or more dynamic MAC CE based or (UL-related or DL-related) DCI signaling.

In one sub-embodiment, if P is fixed, then the number of $(q_1, q_2)$ values that are restricted are fixed, hence instead of length $K_1=O_1$ or $O_1O_2$, the length of the bitmap $B_1$ can be reduced to $$K_1 = \left\lceil \log_2 \binom{O_1}{P} \right\rceil$$

bits for 1D port layout and $$K_1 = \left\lceil \log_2 \binom{O_1 O_2}{P} \right\rceil$$

bits for 2D port layouts, or alternatively, $$K_1 = \left\lceil \log_2 \binom{O_1 O_2}{P} \right\rceil$$

for both 1D and 2d port layouts, where $(O_1, O_2)=(4, 1)$ for 1D port layouts, and $(O_1, O_2)=(4, 4)$ for 2D port layouts. For example, for P=4 and $O_1=4$, the length is $K_1=0$ (i.e., $B_1$ is not indicated) for 1D port layout, and for P=4 and $O_1=O_2=4$, the length is $K_1=11$ bits for 2D port layout.

Alternatively, in another sub-embodiment, if P is fixed, then CBSR is configured via $B_1$ and $B_2$, where: $B_1$ is a length- $$\left\lceil \log_2 \binom{O_1 O_2}{P} \right\rceil$$

indicator which selects P beam groups $G(r_1, r_2)$ for further restriction; and $B_2=B^{(1)}B^{(2)} \ldots B^{(P)}$, where $B^{(i)}$ is a length-$2N_1N_2$ bitmap and restricts DFT beams and associated maximum WB amplitude coefficients in $G(r_1, r_2)$ for the i-th restricted $(r_1, r_2)$ value in $B_1$. For each of the $N_1N_2$ beams, a 2-bit indicator is used for amplitude restriction. The associated WB amplitude coefficients for each layer and polarization of a beam may be at most the indicated $p_{MAX}$ value. An example if 2-bit WB amplitude restriction table is either TABLE 3 or TABLE 4. In one example, P=4; $(O_1, O_2)=(4, 1)$ for 1D port layouts ($N_2=1$), and $(O_1, O_2)=(4, 4)$ for 2D port layouts ($N_2>1$); and Total length of $B_1$ and $B_2$ is $$\left\lceil \log_2 \binom{O_1 O_2}{P} \right\rceil + 2PN_1N_2.$$

Note that $K_1=0$ for 1D port layouts, i.e., CBSR is configured via $B_2$ for 1D port layouts, and via both $B_1$ and $B_2$ for 2D port layouts.

For 2D port layout ($N_2>1$), to determine the bitmap $B_2$, the candidate $(q_1, q_2)$ values are sorted or numbered according to at least one of the numbering schemes in the aforementioned embodiment 5.

In one embodiment 10, which is a combination of embodiment 6 and embodiment 8, $N_1O_1$ DFT beams for 1D antenna port layouts or $N_1N_2O_1O_2$ DFT beams for 2D antenna port layouts are partitioned into beam groups $G(r_1, r_2)$, where $(r_1, r_2)$ is a beam group indicator. A UE is configured with CBSR via higher layer (e.g. RRC) signaling of a bitmap $B=B_1B_2$ or $B_2B_1$, where one part of the bitmap $B_1=b_0b_1b_2 \ldots b_{K_1-1}$ has a fixed length $K_1$ and restricts the values of the beam group indicator $(r_1, r_2)$ as follows.

For 1D port layouts ($N_2=1$), $r_2=0$ and $r_1$ indicates a beam group $G(r_1, r_2)$ comprising $O_1$ adjacent or non-orthogonal DFT beams $\{r_1+x_1: x_1=0, 1, \ldots, O_1-1\}$. The range of values for $r_1$ is $\{0, O_1, \ldots, (N_1-1)O_1\}$. The bitmap $B_1$ restricts the values for $r_1$ and hence $K_1=N_1$.

For 2D port layouts ($N_2>1$), $(r_1, r_2)$ indicates a beam group $G(r_1, r_2)$ comprising $O_1O_2$ adjacent or non-orthogonal DFT beams $\{_r+x_1, r_2+x_2): x_1=0, 1, \ldots, O_1-1, x_2=0, 1 \ldots O_2-1\}$. The range of values for $r_1$ is $\{0, O_1, \ldots, (N_1-1)O_1\}$ and the range of values for $r_2$ is $\{0, O_2, \ldots (N_2-1)O_2\}$. The bitmap $B_1$ restricts the values for $(r_1, r_2)$ and hence $K_1=N_1N_2$.

The another part of the bitmap $B_2$ has a length that depends on the number (P) of values for $(r_1, r_2)$ that are restricted (e.g. set to 0) via the first bitmap $B_1$. In particular, $B_2=B^{(1)}B^{(2)} \ldots B^{(P)}$ is a concatenation of P bitmaps, where the i-th bitmap $B^{(i)}=b_0^{(i)}b_1^{(i)} \ldots b_{K_2-1}^{(i)}$. The i-th bitmap $B^{(i)}$ restricts the WB amplitude values for the DFT beams in the beam group $G(r_1, r_2)$ corresponding to the i-th restricted beam group indicator $(r_1, r_2)$. An example of the WB amplitude codebook is shown in TABLE 1. At least one of the following alternatives is used to restrict WB amplitudes of beams in the beam group $G(r_1, r_2)$.

In one example of Alt 10A, 3 bits is used to restrict the WB amplitude of each DFT beam in the beam group $G(r_1, r_2)$ according to at least one of the following two examples.

In one instance of Ex 10A-1, WB amplitudes for all DFT beams in the beam group $G(r_1, r_2)$ are restricted, and hence $K_2=3O_1$ for 1D port layouts and $3O_1O_2$ for 2D port layouts. The rest of the details are the same as in Ex 8A-1. The overall length of the bitmap B is $K=N_1+3PO_1$ for 1D port layouts and $N_1N_2+3PO_1O_2$ for 2D port layouts.

In one instance of Ex 10A-2, $B_2=B_{21}B_{22}$ or $B_{22}B_{21}$ where the bitmap $B_{21}$ is used to indicate the DFT beams in the beam group $G(r_1, r_2)$ whose WB amplitudes are restricted, and the bitmap $B_{22}$ is used to indicate the corresponding restricted WB amplitude values, where the WB amplitude restriction is explained as in Ex 8A-0. So, $K_2=O_1+3Q$ for 1D port layouts and $O_1O_2+3Q$ for 2D port layouts, where Q is the number of DFT beams whose WB amplitudes are restricted using the bitmap $B_{21}$. For the bitmap $B_2$, the DFT beams are numbered (sorted) according to one of the numbering schemes in the aforementioned embodiment 5. The overall length of the bitmap B is $K=N_1+PO_1+3PQ$ for 1D port layouts and $N_1N_2+3O_1O_2+3PQ$ for 2D port layouts.

In one example of Alt 10B, 1 bit is used to restrict the WB amplitude of each DFT beam in the beam group $G(r_1, r_2)$ according to at least one of the following two examples. Therefore, the length of the bitmap is $K=O_1O_2$ for 2D port layouts and $O_1$ for 1D port layouts. If bit $b_j$ in the bitmap $B^{(i)}$ is set to 1, then the corresponding (j-th) DFT beam is not restricted (hence used) for PMI reporting, and if bit $b_j$ in the bitmap $B^{(i)}$ is set to 0, then the WB amplitude of the corresponding (j-th) DFT beam is restricted to be one of the R smallest amplitude values in TABLE 1. The overall length of the bitmap B is $K=O_1+PN_1$ for 1D port layouts and $O_1O_2+PN_1N_2$ for 2D port layouts.

In one instance of Ex 10B-1, R is fixed, e.g. R=4 which implies that the WB amplitude is restricted to be a value in $\{0, \sqrt{1/64}, \sqrt{1/32}, \sqrt{1/16}\}$.

In one instance of Ex 10B-2, R is configured via 1-bit RRC signaling, where R belongs to either {2, 4} or {1, 2}, where R=1, 2,and 4 correspond to {0}, $\{0, \sqrt{1/64}\}$, and $\{0, \sqrt{1/64}, \sqrt{1/32}, \sqrt{1/16}\}$, respectively.

In one example of Alt 10C, 2 bits are used to restrict the set of WB amplitude values for each DFT beam in the beam group $G(r_1, r_2)$ according to at least one of the following two examples, where the set of amplitude values can be multiple.

In one instance of Ex 10C-0, same as Ex 8C-0 except that WB amplitude restriction is performed for the beams in the beam groups $G(r_1, r_2)$ that are restricted via $B_1$. The overall length of the bitmap B is $K=N_1+2PO_1$ for 1D port layouts and $N_1N_2+2PO_1O_2$ for 2D port layouts.

In one instance of Ex 10C-1, same as Ex 8C-1 except that WB amplitude restriction is performed for the beams in the beam groups $G(r_1, r_2)$ that are restricted via $B_1$. The overall length of the bitmap B is $K=N_1+PO_1+2PQ$ for 1D port layouts and $N_1N_2+PO_1O_2+2PQ$ for 2D port layouts.

The rest of the details of Alt 8C are applicable to this alternative also including alternatives and examples. An example of 2-bit WB amplitude restriction is shown in TABLE 3.

In one example of Alt 10D, 2 bits are used to restrict the WB amplitude for each DFT beam to a single amplitude value from TABLE 1 according to at least one of the following two examples.

In one instance of Ex 10D-0, same as Ex 8D-0 except that WB amplitude restriction is performed for the beams in the beam groups $G(r_1, r_2)$ that are restricted via $B_1$.

In one instance of Ex 10D-1, same as Ex 8D-1 except that WB amplitude restriction is performed for the beams in the beam groups $G(r_1, r_2)$ that are restricted via $B_1$.

The rest of the details of Alt 8D are applicable to this alternative also including alternatives and examples. An example of a 2-bit WB amplitude restriction table for a bit-pair $b_ib_{i+1}$ is shown in TABLE 4.

The value P is either fixed in the specification (e.g. P=1, 2 or 4) or configured via higher layer RRC or more dynamic MAC CE based or (UL-related or DL-related) DCI signaling.

In a sub-embodiment, if P is fixed, then the number of $(r_1, r_2)$ values that are restricted are fixed, hence instead of length $K_1=N_1$ or $N_1N_2$, the length of the bitmap $B_1$ can be reduced to $$K_1 = \left\lceil \log_2 \binom{N_1}{P} \right\rceil$$

bits for 1D port layout and $$K_2 = \left\lceil \log_2 \binom{N_1 N_2}{P} \right\rceil$$

bits for 2D port layouts, or alternatively, $$K_1 = \left\lceil \log_2 \binom{N_1 N_2}{P} \right\rceil$$

for both 1D and 2D port layouts since $N_2=1$ for 1D port layouts. For example, for P=4 and $N_1=4$, the length is $K_1=0$ (i.e., $B_1$ is not indicated) for 1D port layout, and for P=4 and $N_1=N_2=4$, the length is $K_1=11$ bits for 2D port layout. In another example, P=2 if $N_1=2$ and $N_2=1$.

Alternatively, if P is fixed, then CBSR is configured via $B_1$ and $B_2$, where: $B_1$ is a length- $$\left\lceil \log_2 \binom{N_1 N_2}{P} \right\rceil$$

indicator which selects P beam groups $G(r_1, r_2)$ for further restriction; and $B_2=B^{(1)}B^{(2)} \ldots B^{(P)}$, where $B^{(i)}$ is a length-$2O_1O_2$ bitmap and restricts DFT beams and associated maximum WB amplitude coefficients in $G(r_1, r_2)$ for the i-th restricted $(r_1, r_2)$ value in $B_1$. For each of the $O_1O_2$ beams, a 2-bit indicator is used for amplitude restriction. The associated WB amplitude coefficients for each layer and polarization of a beam may be at most the indicated $p_{MAX}$ value. An example if 2-bit WB amplitude restriction table is either TABLE 3 or TABLE 4. In one example, $P=\min(4, N_1N_2)$ and total length of $B_1$ and $B_2$ is $$\left\lceil \log_2 \binom{N_1 N_2}{P} \right\rceil + 2PO_1O_2.$$

Note that $K_1=0$ if $P \geq N_1N_2$, i.e., CBSR is configured via $B_2$ if $P \geq N_1N_2$, and via both $B_1$ and $B_2$ otherwise.

For 2D port layout ($N_2>1$), to determine the bitmap $B_2$, the candidate $(q_1, q_2)$ values are sorted or numbered according to at least one of the numbering schemes in the aforementioned embodiment 5.

In a variation of this embodiment (10A), a UE is configured with beam-level CBSR via higher layer (e.g. RRC) signaling of a bitmap $B=B_1B_2$ or $B_2B_1$, where the bitmap $B_1$ is according to the bitmap $B_1$ in either embodiment 6A or 6B or 6C, and the bitmap $B_2$ is according to at least one of the alternatives for the bitmap B(i) in the aforementioned embodiment 10.

In one embodiment 11, which is a combination of the aforementioned embodiment 7 and embodiment 8, $N_1O_1$ DFT beams for 1D antenna port layouts or $N_1N_2O_1O_2$ DFT beams for 2D antenna port layouts are partitioned into beam groups $G(r_1, r_2)$, where $(r_1, r_2)$ is a beam group indicator. A UE is configured with CBSR via higher layer (e.g. RRC) signaling of a bitmap $B=B_1B_2$ or $B_2B_1$, where one part of the bitmap $B_1=b_0b_1b_2 \ldots b_{K_1-1}$ has a fixed length $K_1$ and restricts the values of the beam group indicator $(r_1, r_2)$ as follows.

For 1D port layouts ($N_2=1$), $r_2=0$ and $r_1$ indicates a beam group $G(r_1, r_2)$ comprising $N_1$ adjacent or non-orthogonal DFT beams $\{r_1+x_1: x_1=0, 1, \ldots, N_1-1\}$. The range of values for $r_1$ is $\{0, N_1, \ldots, (O_1-1)N_1\}$. The bitmap $B_1$ restricts the values for $r_1$ and hence $K_1=O_1$.

For 2D port layouts ($N_2>1$), $(r_1, r_2)$ indicates a beam group $G(r_1, r_2)$ comprising $N_1N_2$ adjacent or non-orthogonal DFT beams $\{_r+x, r_2+x_2)$: $x_1=0, 1, \ldots, N_1-1$, $x_2=0, 1, \ldots, N_2-1\}$. The range of values for $r_1$ is $\{0, N_1, \ldots, (O_1-1)N_1\}$ and the range of values for $r_2$ is $\{0, N_2, \ldots, (O_2-1)N_2\}$. The bitmap $B_1$ restricts the values for $(r_1, r_2)$ and hence $K_1=O_1O_2$.

The another part of the bitmap $B_2$ has a length that depends on the number (P) of values for $(r_1, r_2)$ that are restricted (e.g. set to 0) via the first bitmap $B_1$. In particular, $B_2=B^{(1)}B^{(2)} \ldots B^{(P)}$is a concatenation of P bitmaps, where the i-th bitmap $B^{(i)}=b_0^{(i)}b_1^{(i)} \ldots b_{K_2-1}^{(i)}$. The i-th bitmap $B^{(i)}$ restricts the WB amplitude values for the DFT beams in the beam group $G(r_1, r_2)$ corresponding to the i-th restricted beam group indicator $(r_1, r_2)$. An example of the WB amplitude codebook is shown in TABLE 1. At least one of the following alternatives is used to restrict WB amplitudes of beams in the beam group $G(r_1, r_2)$.

In one example of Alt 11A, 3 bits is used to restrict the WB amplitude of each DFT beam in the beam group $G(r_1, r_2)$ according to at least one of the following two examples.

In one instance of Ex 11A-1, WB amplitudes for all DFT beams in the beam group $G(r_1, r_2)$ are restricted, and hence $K_2=3N_1$ for 1D port layouts and $3N_1N_2$ for 2D port layouts. The rest of the details are the same as in Ex 8A-1. The overall length of the bitmap B is $K=O_1+3PN_1$ for 1D port layouts and $O_1O_2+3PN_1N_2$ for 2D port layouts.

In one instance of Ex 11A-2, $B_2=B_{21}B_{22}$ or $B_{22}B_{21}$ where the bitmap $B_{21}$ is used to indicate the DFT beams in the beam group $G(r_1, r_2)$ whose WB amplitudes are restricted, and the bitmap $B_{22}$ is used to indicate the corresponding restricted WB amplitude values, where the WB amplitude restriction is explained as in Ex 8A-0. So, $K_2=N_1+3Q$ for 1D port layouts and $N_1N_2+3Q$ for 2D port layouts, where Q is the number of DFT beams whose WB amplitudes are restricted using the bitmap $B_{21}$. For the bitmap $B_2$, the DFT beams are numbered (sorted) according to one of the numbering schemes in the aforementioned embodiment 5. The overall length of the bitmap B is $K=O_1+PN_1+3PQ$ for 1D port layouts and $O_1O_2+PN_1N_2+3PQ$ for 2D port layouts.

In one example of Alt 11B, 1 bit is used to restrict the WB amplitude of each DFT beam in the beam group $G(r_1, r_2)$ according to at least one of the following two examples. Therefore, the length of the bitmap is $K=N_1N_2$ for 2D port layouts and $N_1$ for 1D port layouts. If bit $b_j$ in the bitmap B(i) is set to 1, then the corresponding (j-th) DFT beam is not restricted (hence used) for PMI reporting, and if bit $b_1$ in the bitmap $B^{(i)}$ is set to 0, then the WB amplitude of the corresponding (j-th) DFT beam is restricted to be one of the R smallest amplitude values in TABLE 1. The overall length of the bitmap B is $K=O_1+PN_1$ for 1D port layouts and $O_1O_2+PN_1N_2$ for 2D port layouts.

In one instance of Ex 11B-1, R is fixed, e.g. R=4 which implies that the WB amplitude is restricted to be a value in $\{0, \sqrt{1/64}, \sqrt{1/32}, \sqrt{1/16}\}$.

In one instance of Ex 11B-2, R is configured via 1-bit RRC signaling, where R belongs to either {2, 4} or {1, 2}, where R=1, 2,and 4 correspond to $\{0\}$, $\{0, \sqrt{1/64}\}$, and $\{0, \sqrt{1/64}, \sqrt{1/32}, \sqrt{1/16}\}$, respectively.

In one example of Alt 11C, 2 bits are used to restrict the set of WB amplitude values for each DFT beam in the beam group $G(r_1, r_2)$ according to at least one of the following two examples, where the set of amplitude values can be multiple.

In one instance of Ex 11C-0, same as Ex 8C-0 except that WB amplitude restriction is performed for the beams in the beam groups $G(r_1, r_2)$ that are restricted via $B_1$. The overall length of the bitmap B is $K=O_1+2PN_1$ for 1D port layouts and $O_1O_2+2PN_1N_2$ for 2D port layouts.

In one instance of Ex 11C-1, same as Ex 8C-1 except that WB amplitude restriction is performed for the beams in the beam groups $G(r_1, r_2)$ that are restricted via $B_1$. The overall length of the bitmap B is $K=O_1+PN_1+2PQ$ for 1D port layouts and $O_1O_2+PN_1N_2+2PQ$ for 2D port layouts.

The rest of the details of Alt 8C are applicable to this alternative also including alternatives and examples. An example of 2-bit WB amplitude restriction is shown in TABLE 3.

In one example of Alt 11D, 2 bits are used to restrict the WB amplitude for each DFT beam to a single amplitude value from TABLE 1 according to at least one of the following two examples.

In one instance of Ex 11D-0, same as Ex 8D-0 except that WB amplitude restriction is performed for the beams in the beam groups $G(r_1, r_2)$ that are restricted via $B_1$. The overall length of the bitmap B is $K=O_1+2PN_1$ for 1D port layouts and $O_1O_2+2PN_1N_2$ for 2D port layouts.

In one instance of Ex 11D-1, same as Ex 8D-1 except that WB amplitude restriction is performed for the beams in the beam groups $G(r_1, r_2)$ that are restricted via $B_1$. The overall length of the bitmap B is $K=O_1+PN_1+2PQ$ for 1D port layouts and $O_1O_2+PN_1N_2+2PQ$ for 2D port layouts.

The rest of the details of Alt 8D are applicable to this alternative also including alternatives and examples. An example of a 2-bit WB amplitude restriction table for a bit-pair $b_ib_{i+1}$ is shown in TABLE 4.

The value P is either fixed in the specification (e.g. P=1, 2 or 4) or configured via higher layer RRC or more dynamic MAC CE based or (UL-related or DL-related) DCI signaling.

In one sub-embodiment, if P is fixed, then the number of $(r_1, r_2)$ values that are restricted are fixed, hence instead of length $K_1=O_1$ or $O_1O_2$, the length of the bitmap $B_1$ can be reduced to $$K_1 = \left\lceil \log_2 \binom{O_1}{P} \right\rceil$$

bits for 1D port layout and $$K_2 = \left\lceil \log_2 \binom{O_1 O_2}{P} \right\rceil$$

bits for 2D port layouts, or alternatively, $$K_1 = \left\lceil \log_2 \binom{O_1 O_2}{P} \right\rceil$$

for both 1D and 2d port layouts, where $(O_1, O_2)=(4, 1)$ for 1D port layouts, and $(O_1, O_2)=(4, 4)$ for 2D port layouts. For example, for P=4 and $O_1=4$, the length is $K_1=0$ (i.e., $B_1$ is not indicated) for 1D port layout, and for P=4 and $O_1=O_2=4$, the length is $K_1=11$ bits for 2D port layout.

Alternatively, in another sub-embodiment, if P is fixed, then CBSR is configured via $B_1$ and $B_2$, where: $B_1$ is a length- $$\left\lceil \log_2 \binom{O_1 O_2}{P} \right\rceil$$

indicator which selects P beam groups $G(r_1, r_2)$ for further restriction; and $B_2=B^{(1)}B^{(2)} \ldots B^{(P)}$, where $B^{(i)}$ is a length-$2N_1N_2$ bitmap and restricts DFT beams and associated maximum WB amplitude coefficients in $G(r_1, r_2)$ for the i-th restricted $(r_1, r_2)$ value in $B_1$.

For each of the $N_1N_2$ beams, a 2-bit indicator is used for amplitude restriction The associated WB amplitude coefficients for each layer and polarization of a beam may be at most the indicated $P_{MAX}$ value. An example if 2-bit WB amplitude restriction table is either TABLE 3 or TABLE 4. In one example, P=4, $(O_1, O_2)=(4, 1)$ for 1D port layouts ($N_2=1$), and $(O_1, O_2)=(4, 4)$ for 2D port layouts ($N_2>1$), and Total length of $B_1$ and $B_2$ is $$\left\lceil \log_2\binom{O_1O_2}{P} \right\rceil + 2PN_1N_2.$$

Note that $K_1=0$ for 1D port layouts, i.e., CBSR is configured via $B_2$ for 1D port layouts, and via both $B_1$ and $B_2$ for 2D port layouts.

For 2D port layout ($N_2>1$), to determine the bitmap $B_2$, the candidate $(q_1, q_2)$ values are sorted or numbered according to at least one of the numbering schemes in the aforementioned embodiment 5.

In a variation of this embodiment (11A), a UE is configured with beam-level CBSR via higher layer (e.g. RRC) signaling of a bitmap $B=B_1B_2$ or $B_2B_1$, where the bitmap $B_1$ is according to the bitmap $B_1$ in either the aforementioned embodiment 7A or 7B or 7C, and the bitmap $B_2$ is according to at least one of the alternatives for the bitmap $B^{(i)}$ in the aforementioned embodiment 11.

In one embodiment 12, the CBSR on RI for high-resolution (Type II) CSI codebook is according to at least one of the following alternatives. In one example of Alt 12A, if RI is restricted to {1, 2}, then CBSR is not supported for RI restriction. In one example of Alt 12B, if RI is restricted to {1, R}, where for example, R≥2, then CBSR is supported to restrict RI. In one example of Alt 12C, CBSR on RI is supported for all values of RI.

In one embodiment 12A, a UE is configured with CBSR via higher layer (e.g. RRC) signaling on both beam (according to at least one of embodiment 1-11) and RI (according to embodiment 12). For example, CBSR on beam is according to Example 11C-0 in Alt 11C of embodiment 11, and CBSR on RI is according to Alt 12C of embodiment 12. In particular, the UE is configured with higher layer parameters CodebookType set to "TypeII" and CodebookSubsetRestriction that forms the bit sequence $B=B_0B_1B_2$ where bit sequences $B_0$, $B_1$, and $B_2$ are concatenated to form B. The bit sequence $B_0=b_0^{(1)}b_0^{(0)}$ is used for RI restriction, where a bit value of zero indicates that PMI reporting is not allowed to correspond to any precoder associated with the bit. Bit $b_0^{(\upsilon-1)}$ is associated with all precoders for υ layers ($\upsilon\in\{1, 2\}$). To define $B_1$ and $B_2$, first define the $O_1O_2$ vector groups (or beam groups) $G(r_1,r_2)$ as $$G(r_1, r_2) = \{v_{N_1r_1+x_1, N_2r_2+x_2} : x_1 = 0, 1, \ldots, N_1-1; x_2 = 0, 1, \ldots, N_2-1\}$$

$$\text{for } \begin{matrix} r_1 \in \{0, 1, \ldots, O_1-1\} \\ r_2 \in \{0, 1, \ldots, O_2-1\} \end{matrix}.$$

The UE may be configured with restrictions for P=4 vector groups indicated by $(r_1^{(k)},r_2^{(k)})$ for k=0,1,2,3 and identified by the group indices $g^{(k)}=O_1r_2^{(k)}+r_1^{(k)}$ for k=0, 1, . . . , 3, where the indices are assigned such that $g^{(k)}$ increases as k increases (Scheme 0 in the aforementioned embodiment 5). The remaining vector groups are not restricted.

If $N_2=1$, $g^{(k)}=k$ for k=0, 1, . . . , 3, and $B_1$ is empty (hence not transmitted or indicated). If $N_2>1$, $B_1=b_1^{(10)} \ldots b_1^{(0)}$ is the eleven bit binary representation of the integer $\beta_1$ where $b_1^{(10)}$ is the MSB and $b_1^{(0)}$ is the LSB. Note that $$\beta_1 \in \left\{0, 1, \ldots, \binom{O_1O_2}{P}\right\} = \{0, 1, \ldots, 1819\}$$

for $O_1=O_2=4$, and P=4, hence requires 11 bits for binary representation. The group indices $g^{(k)}$ and indicators $(r_1^{(k)}, r_2^{(k)})$ for k=0,1,2,3 may be found from $\beta_1$ using the combinatorial numbering.

The bit sequence $B_2=)B_2^{(0)}B_2^{(1)}B_2^{(2)}B_2^{(3)}$ is the concatenation of the bit sequences $B_2^{(k)}$ for k=0, 1, . . . , 3, corresponding to the group indices $g^{(k)}$. The bit sequence $B_2^{(k)}$ is defined as $B_2^{(k)}=b_2^{(k,2N_1N_2-1)} \ldots b_2^{(k,2(N_1x_2+x_1)+1)}+)$ $b_2^{(k,2(N_1x_2+x_1))}$ indicate the maximum allowed amplitude coefficient $p_{l,i}^{(1)}$ for the vector (or beam) in group $g^{(k)}$ indexed by $x_1,x_2$, where the maximum amplitude coefficients are given in Example 2 of TABLE 3.

In one embodiment 13, CBSR according to some of embodiments 1-12 is also used for CBSR for high-resolution (Type II) codebook when the UE is configured with higher layer parameter CodebookType set to "TypeII-PortSelection" for beamformed CSI-RS ports.

In embodiment X, which is applicable to all embodiments of the present disclosure, the strongest coefficients for layer 0 and layer 1 (if RI=2), indicated using the first PMI components $i_{1,3,1}$ and $i_{1,3,2}$ are reported according to at least one of the following restrictions. In one example of Alt X-A, the strongest coefficients are restricted to the set of DFT beams that are not restricted via CBSR. In one example of Alt X-B, the strongest coefficients are restricted to the set of DFT beams that are not restricted via CBSR or the set of DFT beams that are restricted via CBSR but whose restricted WB amplitude value(s) include(s) 1.

In one embodiment Y, the embodiments on WB amplitude restriction is extended to at least one of the following alternatives. In one example of Alt Y-A, the WB amplitude restriction (e.g. the set of WB amplitude values that are allowed) is common for multiple DFT beams in a beam group. For example, 2-bit indicated can be used to indicate the set of 4 WB amplitude values common for all DFT beams in a beam group. An example of such a set is TABLE 4. In one example of Alt Y-B, the WB amplitude restriction (e.g. the set of WB amplitude values that are allowed) is per DFT beam.

Component 2—codebook subset restriction for low-resolution (Type I) CSI single-panel (Ng=1) codebook.

The single antenna panel ($N_g=1$) rank 3 and 4 codebook for {16, 24, 32} antenna ports is defined as follows. When the UE configured with higher layer parameter CodebookType set to "TypeI-SinglePanel," and when the number of CSI-RS antenna ports $P_{CSI-RS}\geq16$, and the number of layers $\upsilon\in\{3,4\}$, each PMI value corresponds to four codebook indices $i_{1,1}$, $i_{1,2}$, $i_{1,3}$, $i_2$. The codebooks for 3 and 4 layers are given respectively in TABLE 5 and TABLE 6. The quantities $\varphi_n$, $\theta_p$, $u_r$, $v_{l,m}$, and $\tilde{v}_{l,m}$ are given by $$\varphi_n = e^{j\pi n/2}$$
$$\theta_p = e^{j\pi p/4}$$
$$u_m = \begin{cases} \left[1 \ e^{j\frac{2\pi m}{O_2 N_2}} \ \ldots \ e^{j\frac{2\pi m(N_2-1)}{O_2 N_2}}\right] & N_2 > 1 \\ 1 & N_2 = 1 \end{cases}.$$
$$\tilde{v}_{l,m} = \left[u_m \ e^{j\frac{4\pi l}{O_1 N_1}} u_m \ldots \ e^{j\frac{4\pi l(N_1/2-1)}{O_1 N_1}} u_m\right]^T$$

The values of $N_1$ and $N_2$ are configured with the higher layer parameters CodebookConfig-N1 and CodebookConfig-N2, respectively. The supported value of $(O_1, O_2)$ is (4, 1) for 1D antenna port layouts ($N_2$=1) and (4, 4) for 2D antenna port layouts ($N_2$>1). The number of CSI-RS ports, $P_{CSI-RS}$, is $2N_1N_2$.

A UE may only use $i_{1,2}$=0 and may not report $i_{1,2}$ if the value of CodebookConfig-N2 is set to 1.

TABLE 5

Codebook for 3-layer CSI reporting using antenna ports [3000 to 2999 + $P_{CSI-RS}$] CodebookMode = 1-2, $P_{CSI-RS}$ ≥ 16

| $i_{1,1}$ | $i_{1,2}$ | $i_{1,3}$ | $i_2$ | |
|---|---|---|---|---|
| $0, \ldots, \frac{N_1 O_1}{2} - 1$ | $0, \ldots, N_2O_2 - 1$ | 0, 1, 2, 3 | 0, 1 | $W^{(3)}_{i_{1,1}, i_{1,2}, i_{1,3}, i_2}$ |

$$\text{where } W^{(3)}_{l,m,p,n} = \frac{1}{\sqrt{3P_{CSI\text{-}RS}}}\begin{bmatrix} \tilde{v}_{l,m} & \tilde{v}_{l,m} & \tilde{v}_{l,m} \\ \theta_p\tilde{v}_{l,m} & -\theta_p\tilde{v}_{l,m} & \theta_p\tilde{v}_{l,m} \\ \varphi_n\tilde{v}_{l,m} & \varphi_n\tilde{v}_{l,m} & -\varphi_n\tilde{v}_{l,m} \\ \varphi_n\theta_p\tilde{v}_{l,m} & -\varphi_n\theta_n\tilde{v}_{l,m} & -\varphi_n\theta_p\tilde{v}_{l,m} \end{bmatrix}.$$

TABLE 6

Codebook for 4-layer CSI reporting using antenna ports [3000 to 2999 + $P_{CSI-RS}$] CodebookMode = 1-2, $P_{CSI-RS}$ ≥ 16

| $i_{1,1}$ | $i_{1,2}$ | $i_{1,3}$ | $i_2$ | |
|---|---|---|---|---|
| $0, \ldots, \frac{N_1 O_1}{2} - 1$ | $0, \ldots, N_2O_2 - 1$ | 0, 1, 2, 3 | 0, 1 | $W^{(4)}_{i_{1,1}, i_{1,2}, i_{1,3}, i_2}$ |

$$\text{where } W^{(4)}_{l,m,p,n} = \frac{1}{\sqrt{4P_{CSI\text{-}RS}}}\begin{bmatrix} \tilde{v}_{l,m} & \tilde{v}_{l,m} & \tilde{v}_{l,m} & \tilde{v}_{l,m} \\ \theta_p\tilde{v}_{l,m} & -\theta_p\tilde{v}_{l,m} & \theta_p\tilde{v}_{l,m} & -\theta_p\tilde{v}_{l,m} \\ \varphi_n\tilde{v}_{l,m} & \varphi_n\tilde{v}_{l,m} & -\varphi_n\tilde{v}_{l,m} & -\varphi_n\tilde{v}_{l,m} \\ \varphi_n\theta_p\tilde{v}_{l,m} & -\varphi_n\theta_p\tilde{v}_{l,m} & -\varphi_n\theta_p\tilde{v}_{l,m} & \varphi_n\theta_p\tilde{v}_{l,m} \end{bmatrix}.$$

In one embodiment 14, a UE is configured with beam-level CBSR via higher layer (e.g. RRC) signaling of a bitmap, $B=b_0b_1b_2 \ldots b_{K-1}$, of length K to restrict the values of the first PMI components $(i_{1,1}, i_{1,2})$ (indicating $\tilde{v}_{l,m}$). If a bit $b_i$ in the bitmap B is set to zero, then the corresponding value for $(i_{1,1}, i_{1,2})$ is restricted (or not used) for PMI ($i_1$ and $i_2$) reporting. For 1D port layouts ($N_2$=1), the bitmap B restricts the values for $i_{1,1}$ (since $i_{1,2}$=0) and $$K = \frac{N_1 O_1}{2}.$$

For 2D port layouts ($N_2$>1), the bitmap B restricts the values for $(i_{1,1}, i_{1,2})$ and $$K = \frac{N_1 N_2 O_1 O_2}{2}.$$

Note that according to this embodiment, the first PMI component $i_{1,3}$ which indicates phase $\theta_p$ is not restricted.

In one embodiment 15, a UE is configured with beam-level CBSR via higher layer (e.g. RRC) signaling of a bitmap, $B=b_0b_1b_2 \ldots b_{K-1}$, of length K to restrict the values of the first PMI components $(i_{1,1}, i_{1,2}, i_{1,3})$ $$\left(\text{indicating} \begin{bmatrix} \tilde{v}_{l,m} \\ \theta_p\tilde{v}_{l,m} \end{bmatrix}\right).$$

If a bit $b_i$ in the bitmap B is set to zero, then the corresponding value for $(i_{1,1}, i_{1,2}, i_{1,3})$ is restricted (or not used) for PMI ($i_1$ and $i_2$) reporting. For 1D port layouts ($N_2$=1), the bitmap B restricts the values for $(i_{1,1}, i_{1,3})$ (since $i_{1,2}$=0) and $K=2N_1O_1$. For 2D port layouts ($N_2$>1), the bitmap B restricts the values for $(i_{1,1}, i_{1,2}, i_{1,3})$ and $K=2N_1N_2O_1O_2$. Note that according to this embodiment, the first PMI component $i_{1,3}$ which indicates phase $\theta_p$ is also restricted and any value for $\theta_p$ can be restricted.

In one embodiment 16, which is a variation of the aforementioned embodiment 15, a UE is configured with beam-level CBSR via higher layer (e.g. RRC) signaling of a bitmap, $B=b_0b_1b_2 \ldots b_{K-1}$, of length K to restrict the values of the first PMI components $(i_{1,1}, i_{1,2}, i_{1,3})$ $$\left(\text{indicating}\begin{bmatrix} \tilde{v}_{l,m} \\ \theta_p \tilde{v}_{l,m} \end{bmatrix}\right)$$

where only a subset of values for $i_{1,3}$ indicating $\theta_p$ is restricted. Two examples are as follows.

In one instance of Ex 16-1, a fixed $\theta_p$ value (e.g. $\theta_p=0$) is restricted. In one instance of Ex 16-2, a $\theta_p$ value for restriction is configured via higher-layer signaling. For example, 1-bit signaling is used to configure a $\theta_p$ value for restriction from $\{0, 1\}$.

For both examples above, and for 1D port layouts ($N_2=1$), the bitmap B restricts the values for $(i_{1,1}, i_{1,3})$ (since $i_{1,2}=0$) and $$K == 2 \times \frac{N_1 O_1}{2} = N_1 O_1,$$

and for 2D port layouts ($N_2>1$), the bitmap B restricts the values for $(i_{1,1}, i_{1,2}, i_{1,3})$ and $$K = 2 \times \frac{N_1 N_2 O_1 O_2}{2} = N_1 N_2 O_1 O_2,$$

where the multiplication by 2 is used to indicate whether or not a fixed $\theta_p$ value is restricted for a given DFT beam $\tilde{v}_{l,m}$, and the multiplication by $$\frac{N_1 O_1}{2} \text{ or } \frac{N_1 N_2 O_1 O_2}{2}$$

is used to indicate the restriction of all possible DFT beams $\tilde{v}_{l,m}$.

In one embodiment 16A, which is a variation of the aforementioned embodiment 16, a UE is configured with beam-level CBSR via higher layer (e.g. RRC) signaling of a bitmap, $B=b_0b_1b_2 \ldots b_{K-1}$, of length K to restrict $v_{l,m}$ (which is used for rank 3-4 pre-coders for less than 16 CSI-RS ports), where $$v_{l_1,m} = \left[u_m \; e^{j\frac{2\pi l_1}{O_1 N_1}} u_m \; \ldots \; e^{j\frac{2\pi l_1 (N_1-1)}{O_1 N_1}} u_m\right]^T.$$

The restriction on the values of the first PMI components $(i_{1,1}, i_{1,2})$ (indicating $\tilde{v}_{l,m}$) for rank 3-4 pre-coders for greater than or equal to 16 CSI-RS ports is then derived implicitly depending on the restricted $v_{l,m}$. In an example, $\tilde{v}_{l,m}$ is restricted if any $v_{l_1,m}$ belonging to the set $\{v_{l_1,m}: l_1 \in [\text{mod}(2l-1, N_1N_2O_1O_2), \text{mod}(2l+1, N_1N_2O_1O_2)]\}$ is restricted. In another example, if any $v_{l_1,m}$ is restricted, then $\tilde{v}_{l,m}$, where $l=\lfloor l_1/2 \rfloor$ is restricted.

In one embodiment 16B, the CBSR for low-resolution (Type I) single-panel codebook is a combination of multiple CBSR alternatives in some of the embodiment of this present disclosure.

In one embodiment 16C, the UE is configured with the higher layer parameters CodebookType set to "TypeI-SinglePanel" and CodebookSubsetRestriction. The bitmap parameter CodebookSubsetRestriction forms the bit sequence $a_{A_c-1}, \ldots, a_1, a_0$ where $a_0$ is the LSB and $a_{A_c-1}$ is the MSB and where a bit value of zero indicates that PMI and RI reporting are not allowed to correspond to any precoder associated with the bit. The number of bits is given by $A_c=N_1O_1N_2O_2+8$. Except when the number of layers $\upsilon \in \{3,4\}$ and the number of antenna ports is 16, 24, or 32, bit $a_{N_2O_2l+m}$ is associated with all precoders based on the quantity $v_{l,m}$, $l=0, \ldots, N_1O_1-1$, $m=0, \ldots, N_2O_2-1$ and bit $a_{N_1O_1N_2O_2+\upsilon-1}$ is associated with precoders for $\upsilon$ layers ($\upsilon \in \{1,2,3,4,5,6,7,8\}$). When the number of layers $\upsilon \in \{3,4\}$ and the number of antenna ports is 16, 24, or 32, bit $a_{N_2O_2l+m}$ is associated with all precoders based on the quantity $\tilde{v}_{l_1,m}$, where $l_1$ is determined based on $l=0, \ldots, N_1O_1-1$ (e.g. $k_1=\lfloor l/2 \rfloor$), $m=0, \ldots, N_2O_2-1$ and bit $a_{N_1O_1N_2O_2+\upsilon-1}$ is associated with precoders for v layers ($\upsilon \in \{1, 2, 3, 4, 5, 6, 7,8\}$)

Component 3—codebook subset restriction for low-resolution (Type I) CSI multi-panel (Ng>1) codebook.

The multiple antenna panel ($N_g=2$ or 4) codebook is defined as follows. When the UE configured with higher layer parameter CodebookType set to "TypeI-MultiplePanel," each PMI value corresponds to the codebook indices $i_1$ and $i_2$, where $i_1$ is the vector $$i_1 = \begin{cases} [\, i_{1,1} \;\; i_{1,2} \;\; i_{1,4} \,] & \upsilon = 1 \\ [\, i_{1,1} \;\; i_{1,2} \;\; i_{1,3} \;\; i_{1,4} \,] & \upsilon \in \{2, 3, 4\} \end{cases}$$

and $\upsilon$ is the associated RI value. When CodebookMode is set to "1,"

$$i_{1,4} \text{ is } i_{1,4} = \begin{cases} i_{1,4,1} & N_g = 2 \\ [\, i_{1,4,1} \;\; i_{1,4,2} \;\; i_{1,4,3} \,] & N_g = 4 \end{cases}.$$

When CodebookMode is set to "2," $i_{1,4}$ and $i_2$ are $$i_{1,4} = [\, i_{1,4,1} \;\; i_{1,4,2} \,]$$

$$i_2 = [\, i_{2,0} \;\; i_{2,1} \;\; i_{2,2} \,].$$

The mapping from $i_{1,3}$ to $k_1$ and $k_2$ for 2-layer reporting is given in TABLE 7. The mapping from $i_{1,3}$ to $k_1$ and $k_2$ for 3-layer and 4-layer reporting is given in TABLE 8.

TABLE 7

Mapping of $i_{1,3}$ to $k_1$ and $k_2$ for 2-layer CSI reporting

| | $k_1$ | $k_2$ | $k_1$ | $k_2$ | $k_1$ | $k_2$ | $k_1$ | $k_2$ |
|---|---|---|---|---|---|---|---|---|
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ | | | $2O_1$ | 0 |
| 3 | $2O_1$ | 0 | $O_1$ | $O_2$ | | | $3O_1$ | 0 |

TABLE 8

| Mapping of $i_{1,3}$ to $k_1$ and $k_2$ for 3-layer and 4-layer CSI reporting | | | | | | | | | | |
|---|---|---|---|---|---|---|---|---|---|---|
| | $N_1 = 2, N_2 = 1$ | | $N_1 = 4, N_2 = 1$ | | $N_1 = 8, N_2 = 1$ | | $N_1 = 2, N_2 = 2$ | | $N_1 = 4, N_2 = 2$ | |
| $i_{1,3}$ | $k_1$ | $k_2$ | $k_1$ | $k_2$ | $k_1$ | $k_2$ | $k_1$ | $k_2$ | $k_1$ | $k_2$ |
| 0 | $O_1$ | 0 | $O_1$ | 0 | $O_1$ | 0 | $O_1$ | 0 | $O_1$ | 0 |
| 1 | | | $2O_1$ | 0 | $2O_1$ | 0 | 0 | $O_2$ | 0 | $O_2$ |
| 2 | | | $3O_1$ | 0 | $3O_1$ | 0 | $O_1$ | $O_2$ | $O_1$ | $O_2$ |
| 3 | | | | | $4O_1$ | 0 | | | $2O_1$ | 0 |

Several quantities are used to define the codebook elements. The quantities $\varphi_n$, $a_p$, $b_n$, $u_m$, and $v_{l,m}$ are given by $$\varphi_n = e^{j\pi n/2}$$

$$a_p = e^{j\pi/4} e^{j\pi p/2}$$

$$b_n = e^{-j\pi/4} e^{j\pi n/2}$$

$$u_m = \begin{cases} \begin{bmatrix} 1 & e^{j\frac{2\pi m}{O_2 N_2}} & \dots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \dots & e^{j\frac{2\pi l(N_1-1)}{O_1 N_1}} u_m \end{bmatrix}^T.$$

Furthermore, the quantities $W_{l,m,p,n}^{1,N_g,1}$ and $W_{l,m,p,n}^{2,N_g,1}$ ($N_g\{2,4\}$) are given by $$W_{l,m,p,n}^{1,2,1} = \frac{1}{\sqrt{P_{CSI\text{-}RS}}} \begin{bmatrix} v_{l,m} \\ \varphi_n v_{l,m} \\ \varphi_{p_1} v_{l,m} \\ \varphi_n \varphi_{p_1} v_{l,m} \end{bmatrix}$$

$$W_{l,m,p,n}^{2,2,1} = \frac{1}{\sqrt{P_{CSI\text{-}RS}}} \begin{bmatrix} v_{l,m} \\ -\varphi_n v_{l,m} \\ \varphi_{p_1} v_{l,m} \\ -\varphi_n \varphi_{p_1} v_{l,m} \end{bmatrix}$$

-continued $$W_{l,m,p,n}^{1,4,1} = \frac{1}{\sqrt{P_{CSI\text{-}RS}}} \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_2} v_{l,m} \\ \varphi_n \varphi_{p_2} v_{l,m} \\ \varphi_{p_3} v_{l,m} \\ \varphi_n \varphi_{p_3} v_{l,m} \end{bmatrix}$$

$$W_{l,m,p,n}^{2,4,1} = \frac{1}{\sqrt{P_{CSI\text{-}RS}}} \begin{bmatrix} v_{l,m} \\ -\varphi_n v_{l,m} \\ \varphi_{p_1} v_{l,m} \\ -\varphi_n \varphi_{p_1} v_{l,m} \\ \varphi_{p_2} v_{l,m} \\ -\varphi_n \varphi_{p_2} v_{l,m} \\ \varphi_{p_3} v_{l,m} \\ -\varphi_n \varphi_{p_3} v_{l,m} \end{bmatrix}$$

$$p = \begin{cases} p_1 & N_g = 2 \\ [\, p_1 \quad p_2 \quad p_3 \,] & N_g = 4 \end{cases},$$

and the quantities $W_{l,m,p,n}^{1,N_g,2}$ and $W_{l,m,p,n}^{2,N_g,2}$ ($N_g$=2) are given by $$W_{l,m,p,n}^{1,2,2} = \frac{1}{\sqrt{P_{CSI\text{-}RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \end{bmatrix}$$

$$W_{l,m,p,n}^{2,2,2} = \frac{1}{\sqrt{P_{CSI\text{-}RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \end{bmatrix}$$

$$\text{where } \begin{array}{l} p = [\, p_1 \quad p_2 \,] \\ n = [\, n_0 \quad n_1 \quad n_2 \,] \end{array}.$$

The codebooks for 1 and 2 layers are given respectively in TABLE 9 and TABLE 10.

TABLE 9

| Codebook for 1-layer CSI reporting using antenna ports [3000 to 2999 + $P_{CSI\text{-}RS}$] | | | | | |
|---|---|---|---|---|---|
| CodebookMode = "1," $N_g \in \{2, 4\}$ | | | | | |
| $i_{1,1}$ | $i_{1,2}$ | $i_{1,4,q}$, q = 1, . . . , $N_g - 1$ | $i_2$ | | |
| 0, . . . , $N_1O_1 - 1$ | 0, . . . , $N_2O_2 - 1$ | 0, 1, 2, 3 | 0, 1, 2, 3 | $W_{i_{1,1}, i_{1,2}, i_{1,4}, i_2}^{(1)}$ where $W_{l,m,p,n}^{(1)} = W_{l,m,p,n}^{1,N_g,1}$. | |
| CodebookMode = "2," $N_g = 2$ | | | | | |
| $i_{1,1}$ | $i_{1,2}$ | $i_{1,4,q}$, q = 1, 2 | $i_{2,0}$ | $i_{2,q}$, q = 1, 2 | |
| 0, . . . , $N_1O_1 - 1$ | 0, . . . , $N_2O_2 - 1$ | 0, 1, 2, 3 | 0, 1, 2, 3 | 0, 1 | $W_{i_{1,1}, i_{1,2}, i_{1,4}, i_2}^{(1)}$ where $W_{l,m,p,n}^{(1)} = W_{l,m,p,n}^{1,N_g,2}$. |

TABLE 10

| Codebook for 2-layer CSI reporting using antenna ports [3000 to 2999 + $P_{CSI-RS}$] | | | | |
|---|---|---|---|---|
| CodebookMode = "1," $N_g \in \{2, 4\}$ | | | | |
| $i_{1,1}$ | $i_{1,2}$ | $i_{1,4,q}$, $q = 1, \ldots, N_g - 1$ | $i_2$ | |
| $0, \ldots, N_1O_1 - 1$ | $0, \ldots, N_2O_2 - 1$ | 0, 1, 2, 3 | 0, 1 | $W_{i_{1,1},i_{1,1}+k_1,i_{1,2},i_{1,2}+k_2,i_{1,4},i_2}^{(2)}$ |
| where $W_{l,l'm,m',p,n}^{(2)} = \frac{1}{\sqrt{2}}\left[\, W_{l,m,p,n}^{1,N_g,1} \quad W_{l',m',p,n}^{2,N_g,1} \,\right]$ and the mapping from $i_{1,3}$ to $k_1$ and $k_2$ is given in LTE specification. | | | | |
| CodebookMode = "2," $N_g = 2$ | | | | |
| $i_{1,1}$ | $i_{1,2}$ | $i_{1,4,q}$, $q = 1, 2$ | $i_{2,q}$, $q = 0, 1, 2$ | |
| $0, \ldots, N_1O_1 - 1$ | $0, \ldots, N_2O_2 - 1$ | 0, 1, 2, 3 | 0, 1 | $W_{i_{1,1},i_{1,1}+k_1,i_{1,2},i_{1,2}+k_2,i_{1,4},i_2}^{(2)}$ |
| where $W_{l,l'm,m',p,n}^{(2)} = \frac{1}{\sqrt{2}}\left[\, W_{l,m,p,n}^{1,N_g,2} \quad W_{l',m',p,n}^{2,N_g,2} \,\right]$ and the mapping from $i_{1,3}$ to $k_1$ and $k_2$ is given in LTE specification | | | | |

In one embodiment 17, a UE is configured with beam-level CBSR via higher layer (e.g. RRC) signaling of a bitmap, $B=b_0b_1b_2 \ldots b_{K-1}$, of length K to restrict the values of the first PMI components ($i_{1,1}$, $i_{1,2}$) (indicating $v_{l,m}$). If a bit $b_i$ in the bitmap B is set to zero, then the corresponding value for ($i_{1,1}$, $i_{1,2}$) is restricted (or not used) for PMI ($i_1$ and $i_2$) reporting. For 1D port layouts ($N_2=1$), the bitmap B restricts the values for $i_{1,1}$ (since $i_{1,2}=0$) and $K=N_1O_1$. For 2D port layouts ($N_2>1$), the bitmap B restricts the values for (i,1, $i_{1,2}$) and $K=N_1N_2O_1O_2$. Note that according to this embodiment, the first PMI components $i_{1,3}$ and $i_{1,4}$, which respectively indicate ($k_1$, $k_2$) in case of rank 2-4 and WB inter-panel phase p, are not restricted.

In one embodiment 17A, a UE is configured with higher layer parameter CodebookType set to "TypeI-MultiplePanel" and also configured with both beam-level and RI-level CB SR via the higher layer parameter CodebookSubsetRestriction, which forms the bit sequence $a_{A_c-1}, \ldots, a_1, a_0$ where $a_0$ is the LSB and $a_{A_c-1}$ is the MSB and where a bit value of zero indicates that PMI and RI reporting are not allowed to correspond to any precoder associated with the bit. The number of bits is given by $A_c=N_1O_1N_2O_2+4$. Bit $a_{N_2O_2l+m}$ is associated with all precoders based on the quantity $v_{l,m}$, $l=0, \ldots, N_1O_1-1$, $m=0, \ldots, N_2O_2-1$, as defined earlier, and bit $a_{N_1O_1N_2O_2+\upsilon-1}$, is associated with precoders for a layers ($\upsilon \in \{1,2,3,4\}$).

In one embodiment 18, a UE is configured with beam-level CBSR via higher layer (e.g. RRC) signaling of a bitmap, $B=b_0b_1b_2 \ldots b_{K-1}$, of length K to restrict the values of the first PMI components ($i_{1,1}$, $i_{1,2}$) for rank 1 and ($i_{1,1}$, $i_{1,2}$, $i_{1,3}$) for rank 2-4 (indicating $v_{l,m}$ and ($k_1$, $k_2$)). If a bit $b_i$ in the bitmap B is set to zero, then the corresponding value for ($i_{1,1}$, $i_{1,2}$) for rank 1 and ($i_{1,1}$, $i_{1,2}$, $i_{1,3}$) for rank 2-4 is restricted (or not used) for PMI ($i_1$ and $i_2$) reporting. For 1D port layouts ($N_2=1$), the bitmap B restricts the values for ($i_{1,1}$, $i_{1,3}$) (since $i_{1,2}=0$) and $K=QN_1O_1$, and for 2D port layouts ($N_2>1$), the bitmap B restricts the values for ($i_{1,1}$, $i_{1,2}$, $i_{1,3}$) and $K=QN_1N_2O_1O_2$, where Q=1 for rank 1 and Q=number of possible ($k_1$, $k_2$) values for rank 2-4.

In a variation of this embodiment, similar to embodiment 16, where only a subset of values for $i_{1,3}$ indicating ($k_1$, $k_2$) is restricted.

In one embodiment 19, a UE is configured with beam-level CBSR via higher layer (e.g. RRC) signaling of a bitmap, $B=b_0b_1b_2 \ldots b_{K-1}$, of length K to restrict the values of the first PMI components ($i_{1,1}$, $i_{1,2}$, $i_{1,4}$) (indicating $v_{l,m}$ and p). If a bit $b_i$ in the bitmap B is set to zero, then the corresponding value for ($i_{1,1}$, $i_{1,2}$, $i_{1,4}$) is restricted (or not used) for PMI ($i_1$ and $i_2$) reporting. For 1D port layouts ($N_2=1$), the bitmap B restricts the values for ($i_{1,1}$, $i_{1,4}$) (since $i_{1,2}=0$) and $K=QN_1O_1$, and for 2D port layouts ($N_2>1$), the bitmap B restricts the values for ($i_{1,1}$, $i_{1,2}$, $i_{1,4}$) and $K=QN_1N_2O_1O_2$, where Q=number of possible values that p can take.

In a variation of this embodiment, similar to embodiment 16, where only a subset of values for $i_{1,4}$ indicating p is restricted.

In one embodiment 20, a UE is configured with beam-level CBSR via higher layer (e.g. RRC) signaling of a bitmap, $B=b_0b_1b_2 \ldots b_{K-1}$, of length K to restrict the values of the first PMI components ($i_{1,1}$, $i_{1,2}$, $i_{1,4}$) for rank 1 and ($i_{1,1}$, $i_{1,2}$, $i_{1,3}$, $i_{1,4}$) for rank 2-4 (indicating $v_{l,m}$, ($k_1$, $k_2$), and p). If a bit $b_i$ in the bitmap B is set to zero, then the corresponding value for ($i_{1,1}$, $i_{1,2}$, $i_{1,4}$) for rank 1 and ($i_{1,1}$, $i_{1,2}$, $i_{1,3}$, $i_{1,4}$) for rank 2-4 is restricted (or not used) for PMI ($i_1$ and $i_2$) reporting. For 1D port layouts ($N_2=1$), the bitmap B restricts the values for ($i_{1,1}$, $i_{1,3}$) (since $i_{1,2}=0$) and $K=QN_1O_1$, and for 2D port layouts ($N_2>1$), the bitmap B restricts the values for ($i_{1,1}$, $i_{1,2}$, $i_{1,3}$) and $K=QN_1N_2O_1O_2$, where Q=number of possible ($k_1$, $k_2$) values and p.

In a variation of this embodiment, similar to embodiment 16, where only a subset of values for $i_{1,3}$ indicating ($k_1$, $k_2$) or/and $i_{1,4}$ indicating p is/are restricted.

In one embodiment 21, the CBSR for low-resolution (Type I) multi-panel codebook is a combination of multiple CBSR alternatives in some of the embodiment of the present disclosure.

In all embodiments of the present disclosure, if multiple CBSR alternatives are supported, then one of the alternatives is configured via RRC signaling.

Figure 14:
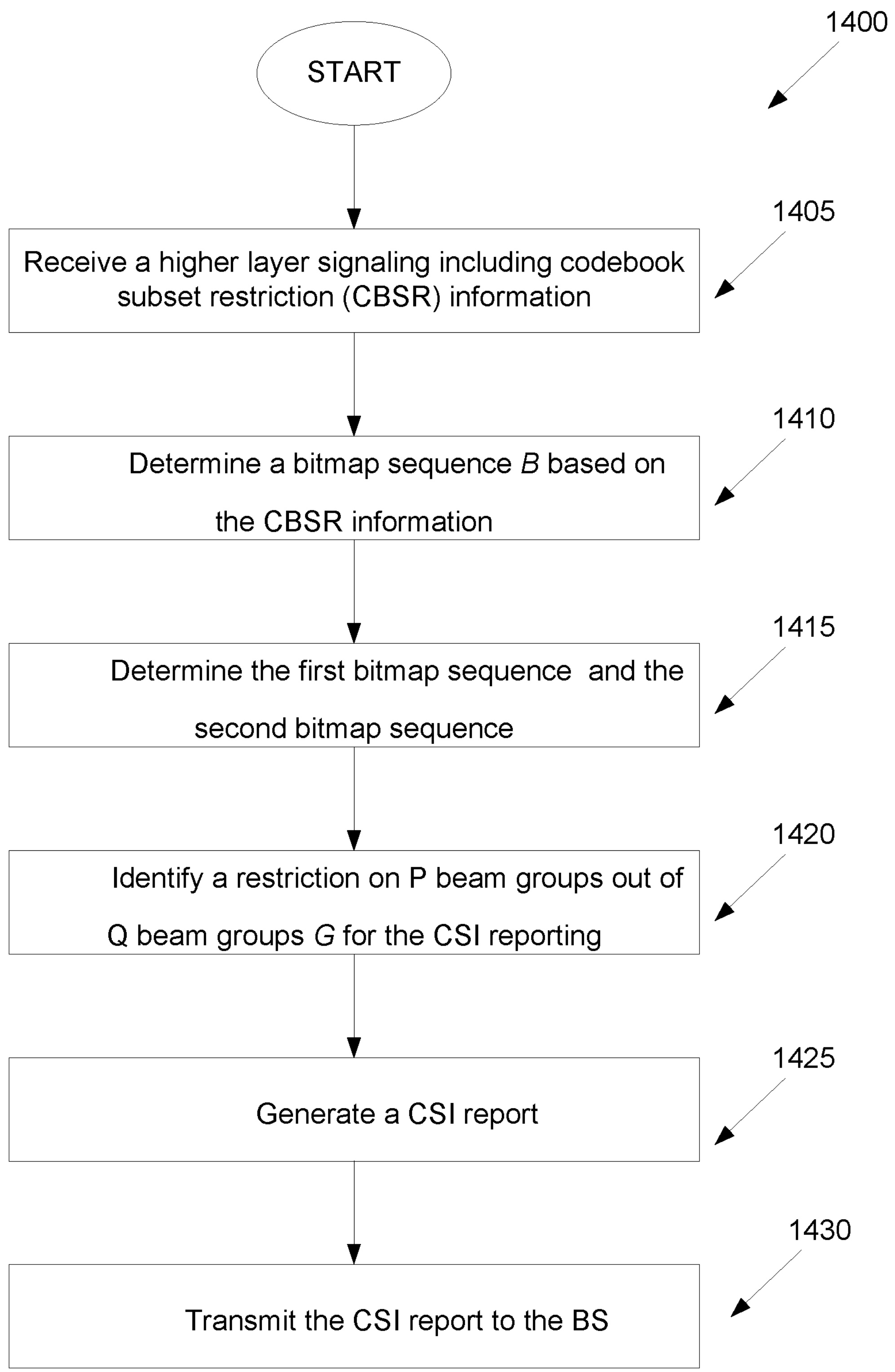
FIG. 14 illustrates a flowchart of a method for codebook subset restriction according to embodiments of the present disclosure.

FIG. 14 illustrates a flowchart of a method 1400 for codebook subset restriction according to embodiments of the present disclosure, as may be performed by a user equipment (UE) (e.g., 111-116 as illustrated in FIG. 1). The embodiment of the method 1400 illustrated in FIG. 14 is for illustration only. FIG. 14 does not limit the scope of this disclosure to any particular implementation.

As illustrated in FIG. 14, the method 1400 for channel state information (CSI) reporting begins at step 1405. In step 1405, the UE receives, from a base station (BS), a higher layer signaling including codebook subset restriction (CBSR) information.

In step 1410, the UE determines a bitmap sequence B based on the CBSR information, wherein the bitmap sequence B includes a first bitmap sequence $B_1$ and a second bitmap sequence $B_2$.

In step 1410, the bitmap sequence $B=B_1B_2$ is a concatenation of the first bitmap sequence $B_1$ and the second bitmap sequence $B_2$; the first bitmap sequence $B_1$ indicates index pairs $(r_1, r_2)$ of the P beam groups $G(r_1,r_2)$; the second bitmap sequence $B_2=B^{(1)}B^{(2)} \ldots B^{(P)}$ is a concatenation of P bitmaps $B_2^{(k)}$ for k=0, 1, . . . , P−1; and the restriction on a k-th beam group of the P beam groups is indicated via a k-th bitmap $B_2^{(k)}$ of the P bitmaps.

In one embodiment, k-th bitmap $B_2^{(k)}=b_2^{(k,2N_1N_2-1)} \ldots b_2^{(k,0)}$ is of length $2N_1N_2$, where a bit pair $b_2^{(k,2(N_1x_2+x_1)+1)} \ldots b_2^{(k,2(N_1x_2+x_1))}$ indicates the restriction on a maximum allowed amplitude coefficient for a beam indexed by $(x_1, x_2)$ in the k-th beam group of the P beam groups.

In one embodiment, P is four. In one embodiment, a mapping of the bit pair to the maximum allowed amplitude coefficient is determined based on a table given by:

| bit-pair | maximum amplitude coefficient |
|---|---|
| 00 | 0 |
| 01 | $\sqrt{1/4} = \sqrt{0.25}$ |
| 10 | $\sqrt{1/2} = \sqrt{0.5}$ |
| 11 | 1 |

In step 1415, the UE determines the first bitmap sequence $B_1$ and the second bitmap sequence $B_2$ based on the bitmap sequence B.

In step 1420, the UE identifies, based on the first bitmap sequence $B_1$ and the second bitmap sequence $B_2$, a restriction on P beam groups out of Q beam groups $G(r_1, r_2)$ for the CSI reporting. In this step, P is a positive integer and is less than or equal to Q, Q is a total number of beam groups $G(r_1, r_2)$, and an index pair $(r_1, r_2)$ indicates a beam group of the Q beam groups $G(r_1, r_2)$. In step 1420, each beam group $G(r_1, r_2)$ corresponds to a vector group comprising $N_1N_2$ discrete Fourier transform (DFT) vectors, where $N_1$ and $N_2$ indicated by the higher layer signaling are a number of antenna ports with a given polarization in a first and second dimension of an antenna port layout at the BS, respectively.

In one embodiment, $Q=\theta_1\theta_2$ and the Q vector groups are given by $G(r_1,r_2)=\{v_{N_1r_1+x_1,N_2r_2+x_2}: x_1=0, 1, \ldots, N_1-1; x_2=0, 1, \ldots, N_2-1\}$ where:

$$\begin{matrix} r_1 \in \{0, 1, \ldots, O_1 - 1\} \\ r_2 \in \{0, 1, \ldots, O_2 - 1\} \end{matrix},$$

$v_{l,m}$ is a DFT vector $$v_{l,m} = \begin{bmatrix} u_m & e^{j\frac{2\pi l}{O_1N_1}}u_m & \ldots & e^{j\frac{2\pi l(N_1-1)}{O_1N_1}}u_m \end{bmatrix}^T$$

with $$u_m = \begin{cases} \begin{bmatrix} 1 & e^{j\frac{2\pi m}{O_2N_2}} & \ldots & e^{j\frac{2\pi m(N_2-1)}{O_2N_2}} \end{bmatrix} & N_2 > 1 \\ 1 & N_2 = 1 \end{cases};$$

and $O_1$ and $O_2$ are oversampling factors in the first and second dimension, respectively.

In one embodiment, if $N_2=1$, the first bitmap $B_1$ is empty; and if $N_2>1$, a length of the first bitmap sequence $B_1$ is 11 bits that indicate P=4 beam groups out of $Q=O_1O_2=16$ total beam groups.

In step 1425, the UE generates a CSI report based on the P beam groups with the identified restriction for the CSI reporting and remaining beam groups without any restrictions for the CSI reporting. In this step 1425, the remaining beam groups are determined as the Q beam groups $G(r_1, r_2)$ minus the P beam groups.

In step 1430, the UE transmits the CSI report to the BS.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for channel state information (CSI) reporting in a wireless communication system, the UE comprising:

a transceiver configured to receive, from a base station (BS), a higher layer signaling including codebook subset restriction (CBSR) information including a bitmap having a portion indicating a restriction on $N_1N_2$ beam groups $G(r_1, r_2)$ for an antenna port layout; and a processor operably connected to the transceiver, the processor configured to determine a number of beams (L) within each beam group of the $N_1N_2$ beam groups $G(r_1, r_2)$, wherein L is $O_1$ for a one-dimensional antenna port layout ($N_2=1$) and L is $O_1O_2$ for a two-dimensional antenna port layout ($N_2>1$), identify, based on the CBSR information, the restriction on $N_1N_2$ beam groups $G(r_1, r_2)$, and determine a CSI report based on the identified restriction on the $N_1N_2$ beam groups $G(r_1, r_2)$, wherein the transceiver is further configured to transmit the CSI report to the BS, where $N_1$ and $N_2$ respectively are number of antenna ports in first and second dimensions of the antenna port layout, $O_1$ and $O_2$ are oversampling factors in first and second dimensions, respectively, and an index pair $(r_1, r_2)$ indicates a beam group of the $N_1N_2$ beam groups $G(r_1, r_2)$.

2. The UE of claim 1, wherein the bitmap has the portion $B^{(1)}B^{(2)} \ldots B^{(N_1N_2)}$ of length $2N_1N_2$, where $B^{(i)}=b_0^{(i)}b_1^{(i)}$, is a bit-pair for an i-th beam group of the $N_1N_2$ beam groups $G(r_1, r_2)$, and indicates the restriction on amplitude for each beam within the i-th beam group.

3. The UE of claim 2, wherein values for the bit pair indicating the restriction on amplitude map to a maximum relative amplitude as

| Bit-pair values | Maximum relative amplitude |
|---|---|
| 00 | 0 |
| 01 | $\sqrt{1/4} = \sqrt{0.25}$ |
| 10 | $\sqrt{1/2} = \sqrt{0.5}$ |
| 11 | 1. |

4. The UE of claim 2, wherein the restriction on amplitude restricts maximum relative amplitude for all beams within the i-th beam group.

5. The UE of claim 1, wherein the bitmap includes another portion indicating a restriction on rank indicator (RI) values for the CSI report.

6. The UE of claim 1, wherein each beam group $G(r_1, r_2)$ corresponds to a vector group comprising L discrete Fourier transform (DFT) vectors.

7. The UE of claim 6, wherein the $N_1N_2$ vector groups are given by $G(r_1, r_2)=\{v_{O_1r_1+x_1,O_2r_2+x_2}: x_1=0,1, \ldots, O_1-1; x_2=0,1, \ldots, O_2-1\}$ where $r_1 \in \{0, 1, \ldots, N_1\}$ and $r_2 \in \{0, 1, \ldots, N_2\}$ if $N_2>1$, $G(r_1, r_2)=\{v_{O_1r_1+x_1,0}: x_1=0,1, \ldots, O_1-1\}$ where $r_1 \in \{0, 1, \ldots, N_1\}$ and $r_2=0$ if $N_2=1$, and $v_{l,m}$ is a DFT vector such that $$v_{l,m} = \left[ u_m \quad e^{j\frac{2\pi l}{O_1N_1}} u_m \quad \ldots \quad e^{j\frac{2\pi l(N_1-1)}{O_1N_1}} u_m \right]^T$$

with $$u_m = \begin{cases} \left[ 1 \quad e^{j\frac{2\pi m}{O_2N_2}} \quad \ldots \quad e^{j\frac{2\pi m(N_2-1)}{O_2N_2}} \right] & N_2 > 1 \\ 1 & N_2 = 1 \end{cases}.$$

8. The UE of claim 1, wherein $O_1=4$ for a one-dimensional antenna port layout ($N_2=1$) and $O_1=O_2=4$ for a two-dimensional antenna port layout ($N_2>1$).

9. A base station (BS) for processing channel state information (CSI) reports in a wireless communication system, the BS comprising:

a transceiver configured to transmit, to a user equipment (UE), a higher layer signaling including codebook subset restriction (CBSR) information including a bitmap having a portion indicating a restriction on $N_1N_2$ beam groups $G(r_1, r_2)$ for an antenna port layout, wherein a number of beams (L) are determined within each beam group of the $N_1N_2$ beam groups $G(r_1, r_2)$, wherein L is $O_1$ for a one-dimensional antenna port layout ($N_2=1$) and L is $O_1O_2$ for a two-dimensional antenna port layout ($N_2>1$), and the restriction on $N_1N_2$ beam groups $G(r_1, r_2)$ is identified based on the CB SR information, and receive a CSI report from the UE determined based on the identified restriction on the $N_1N_2$ beam groups $G(r_1, r_2)$, where $N_1$ and $N_2$ respectively are number of antenna ports in first and second dimensions of the antenna port layout, $O_1$ and $O_2$ are oversampling factors in first and second dimensions, respectively, and an index pair $(r_1, r_2)$ indicates a beam group of the $N_1N_2$ beam groups $G(r_1, r_2)$.

10. The BS of claim 9, wherein the bitmap has the portion $B^{(1)}B^{(2)} \ldots B^{(N_1N_2)}$ of length $2N_1N_2$, where $B^{(i)}=b_0^{(i)}b_1^{(i)}$ is a bit-pair for an i-th beam group of the $N_1N_2$ beam groups $G(r_1, r_2)$, and indicates the restriction on amplitude for each beam within the i-th beam group.

11. The BS of claim 10, wherein values for the bit pair indicating the restriction on amplitude map to a maximum relative amplitude as

| Bit-pair values | Maximum relative amplitude |
|---|---|
| 00 | 0 |
| 01 | $\sqrt{1/4} = \sqrt{0.25}$ |
| 10 | $\sqrt{1/2} = \sqrt{0.5}$ |
| 11 | 1. |

12. The BS of claim 10, wherein the restriction on amplitude restricts maximum relative amplitude for all beams within the i-th beam group.

13. The BS of claim 9, wherein the bitmap includes another portion indicating a restriction on rank indicator (RI) values for the CSI report.

14. The BS of claim 9, wherein each beam group $G(r_1, r_2)$ corresponds to a vector group comprising L discrete Fourier transform (DFT) vectors.

15. The BS of claim 14, wherein the $N_1N_2$ vector groups are given by $G(r_1, r_2)=\{v_{O_1r_1+x_1,O_2r_2+x_2}: x_1=0,1, \ldots, O_1-1; x_2=0,1, \ldots, O_2-1\}$ where $r_1 \in \{0, 1, \ldots, N_1\}$ and $r_2 \in \{0, 1, \ldots, N_2\}$ if $N_2>1$, $G(r_1, r_2)=\{v_{O_1r_1+x_1,0}: x_1=0,1, \ldots, O_1-1\}$ where $r_1 \in \{0, 1, \ldots, N_1\}$ and $r_2=0$ if $N_2=1$, and $v_{l,m}$ is a DFT vector such that $$v_{l,m} = \left[ u_m \quad e^{j\frac{2\pi l}{O_1N_1}} u_m \quad \ldots \quad e^{j\frac{2\pi l(N_1-1)}{O_1N_1}} u_m \right]^T$$

with $$u_m = \begin{cases} \left[ 1 \quad e^{j\frac{2\pi m}{O_2N_2}} \quad \ldots \quad e^{j\frac{2\pi m(N_2-1)}{O_2N_2}} \right] & N_2 > 1 \\ 1 & N_2 = 1 \end{cases}.$$

16. The BS of claim 9, wherein $O_1=4$ for a one-dimensional antenna port layout ($N_2=1$) and $O_1=O_2=4$ for a two-dimensional antenna port layout ($N_2>1$).

17. A method within a user equipment (UE) for channel state information (CSI) reporting in a wireless communication system, the method comprising:

receiving, from a base station (BS), a higher layer signaling including codebook subset restriction (CBSR) information including a bitmap having a portion indicating a restriction on $N_1N_2$ beam groups $G(r_1, r_2)$ for an antenna port layout; and determining a number of beams (L) within each beam group of the $N_1N_2$ beam groups $G(r_1, r_2)$, wherein L is $O_1$ for a one-dimensional antenna port layout ($N_2=1$) and L is $O_1O_2$ for a two-dimensional antenna port layout ($N_2>1$);

identifying, based on the CBSR information, the restriction on $N_1N_2$ beam groups $G(r_1, r_2)$;

determining a CSI report based on the identified restriction on the $N_1N_2$ beam groups $G(r_1, r_2)$; and transmitting the CSI report to the BS, where $N_1$ and $N_2$ respectively are number of antenna ports in first and second dimensions of the antenna port layout, $O_1$ and $O_2$ are oversampling factors in first and second dimensions, respectively, and an index pair $(r_1, r_2)$ indicates a beam group of the $N_1N_2$ beam groups $G(r_1, r_2)$.

18. The method of claim 17, wherein the bitmap has the portion $B^{(1)}B^{(2)} \ldots B^{(N_1N_2)}$ of length $2N_1N_2$, where $B^{(i)}=b_0^{(i)}b_1^{(i)}$ is a bit-pair for an i-th beam group of the $N_1N_2$ beam groups $G(r_1, r_2)$, and indicates the restriction on amplitude for each beam within the i-th beam group.

19. The method of claim 18, wherein values for the bit pair indicating the restriction on amplitude map to a maximum relative amplitude as

| Bit-pair values | Maximum relative amplitude |
|---|---|
| 00 | 0 |
| 01 | $\sqrt{1/4} = \sqrt{0.25}$ |
| 10 | $\sqrt{1/2} = \sqrt{0.5}$ |
| 11 | 1. |

20. The method of claim 18, wherein the restriction on amplitude restricts maximum relative amplitude for all beams within the i-th beam group.

21. The method of claim 17, wherein the bitmap includes another portion indicating a restriction on rank indicator (RI) values for the CSI report.

22. The method of claim 17, wherein each beam group $G(r_1, r_2)$ corresponds to a vector group comprising L discrete Fourier transform (DFT) vectors.

23. The method of claim 22, wherein the $N_1N_2$ vector groups are given by $G(r_1, r_2)=\{v_{O_1r_1+x_1, O_2r_2+x_2}: x_1=0,1, \ldots, O_1-1; x_2=0,1, \ldots, O_2-1\}$ where $r_1\in\{0, 1, \ldots, N_1\}$ and $r_2\in\{0, 1, \ldots, N_2\}$ if $N_2>1$, $G(r_1, r_2)=\{v_{O_1r_1+x_1, 0}: x_1=0,1, \ldots, O_1-1\}$ where $r_1\in\{0, 1, \ldots, N_1\}$ and $r_2=0$ if $N_2=1$, and $v_{l,m}$ is a DFT vector such that $$v_{l,m} = \begin{bmatrix} u_m & e^{j\frac{2\pi l}{O_1N_1}}u_m & \ldots & e^{j\frac{2\pi l(N_1-1)}{O_1N_1}}u_m \end{bmatrix}^T$$

with $$u_m = \begin{cases} \begin{bmatrix} 1 & e^{j\frac{2\pi m}{O_2N_2}} & \ldots & e^{j\frac{2\pi m(N_2-1)}{O_2N_2}} \end{bmatrix} & N_2 > 1 \\ 1 & N_2 = 1 \end{cases}.$$

24. The method of claim 17, wherein $O_1=4$ for a one-dimensional antenna port layout ($N_2=1$) and $O_1=O_2=4$ for a two-dimensional antenna port layout ($N_2>1$).

* * * * *